United States Patent
Akashi

(10) Patent No.: US 10,931,895 B2
(45) Date of Patent: Feb. 23, 2021

(54) IMAGE PROCESSING METHOD, IMAGE PROCESSING DEVICE, AND STORAGE MEDIUM

(71) Applicant: NEC Corporation, Tokyo (JP)

(72) Inventor: Ryuichi Akashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/468,743

(22) PCT Filed: Dec. 15, 2017

(86) PCT No.: PCT/JP2017/045058
§ 371 (c)(1),
(2) Date: Jun. 12, 2019

(87) PCT Pub. No.: WO2018/116972
PCT Pub. Date: Jun. 28, 2018

(65) Prior Publication Data
US 2019/0320126 A1 Oct. 17, 2019

(30) Foreign Application Priority Data
Dec. 22, 2016 (JP) .............................. JP2016-249056

(51) Int. Cl.
H04N 9/04 (2006.01)
H04N 9/07 (2006.01)
(Continued)

(52) U.S. Cl.
CPC ............. *H04N 5/332* (2013.01); *G02B 5/208* (2013.01); *H04N 9/04* (2013.01)

(58) Field of Classification Search
None
See application file for complete search history.

(56) References Cited

U.S. PATENT DOCUMENTS

| 2008/0278592 A1* | 11/2008 | Kuno | H04N 9/045 348/222.1 |
| 2015/0062347 A1* | 3/2015 | Jin | H04N 5/332 348/164 |
| 2016/0255286 A1 | 9/2016 | Tsukada | |

FOREIGN PATENT DOCUMENTS

| JP | 2011-243862 A | 12/2011 |
| JP | 2012-227758 A | 11/2012 |

(Continued)

OTHER PUBLICATIONS

International Search Report for PCT Application No. PCT/JP2017/045058, dated Mar. 6, 2018.
(Continued)

*Primary Examiner* — Dave Czekaj
*Assistant Examiner* — Samuel D Fereja

(57) ABSTRACT

An image processing device (10) is provided with: an estimation unit (11) for estimating, by using image data and a spectral sensitivity characteristic of a color image sensor in a wavelength range from visible light to near-infrared light, a spectral distribution characteristic of an incident light incident on the color image sensor, based on a model expressing the spectral distribution characteristic of the incident light, the image data including one or more color channels and acquired by capturing, using the color image sensor, the incident light including visible light and near-infrared light; and a generation unit (12) for generating, using the estimated spectral distribution characteristic of the incident light and the spectral sensitivity characteristic of the color image sensor, visible light image data configured only from information representing the visible light and near-infrared light image data configured only from information representing the near-infrared light.

9 Claims, 16 Drawing Sheets

(51) Int. Cl.
*H04N 5/33* (2006.01)
*G02B 5/20* (2006.01)

(56) References Cited

FOREIGN PATENT DOCUMENTS

| JP | 2015-204579 A | 11/2015 |
| JP | 2016-072741 A | 5/2016 |
| WO | 2015/059897 A1 | 4/2015 |

OTHER PUBLICATIONS

English translation of Written opinion for PCT Application No. PCT/JP2017/045058.

* cited by examiner

IMAGE PROCESSING METHOD, IMAGE PROCESSING DEVICE, AND STORAGE MEDIUM

This application is a National Stage Entry of PCT/JP2017/045058 filed on Dec. 15, 2017, which claims priority from Japanese Patent Application 2016-249056 filed on Dec. 22, 2016, the contents of all of which are incorporated herein by reference, in their entirety.

TECHNICAL FIELD

The present invention relates to an image processing method, an image processing device, and a storage medium that are able to generate a visible light image signal and a near-infrared light image signal from an image signal captured by a color camera in a high-sensitivity capturing mode using near-infrared light, which is used for capturing in a dark place and the like.

BACKGROUND ART

Human color perception senses light associated with a wavelength range from 400 nm to 700 nm. The light associated with the wavelength range from 400 nm to 700 nm is called visible light.

Further, a general image sensor such as a complementary metal oxide semiconductor (CMOS) and a charge coupled device (CCD) for capturing image data exhibits a spectral sensitivity characteristic of detecting not only visible light having a wavelength of any value from 400 nm to 700 nm, but also near-infrared (NIR) light being light having a wavelength longer than 700 nm, as illustrated in FIG. 14.

FIG. 14 is an explanatory diagram illustrating one example of a spectral sensitivity characteristic of a general image sensor. As illustrated in FIG. 14, the image sensor exhibits high sensitivity of detecting 80% or more of near-infrared light associated with a wavelength range from 700 nm to 800 nm.

When an image sensor used in an image capturing device is a silicon-based sensor, the image sensor also exhibits sensitivity to near-infrared light besides visible light. In general, near-infrared light is defined as light having a wavelength that is approximately from 0.7 μm to 2 μm.

An image sensor in an image capturing device such as a digital camera and a video camera usually includes a three-color optical filter (hereinafter, simply referred to as an RGB optical filter or a color filter.) incorporated therein that transmits only red (R) light, green (G) light, and blue (B) light.

Light incident on the camera is decomposed by the three-color optical filter. The decomposed light is converted into an image signal by the image sensor. Finally, RGB image data being a collection of converted image signals are generated.

Hereinafter, a sensor acquired by applying an RGB optical filter to the above-described image sensor will be called a color image sensor. Image data to be output by the color image sensor are image data of RGB channels including R channel, G channel, and B channel.

An example of a spectral transmission characteristic of an RGB optical filter is illustrated in FIG. 15. FIG. 15 is an explanatory diagram illustrating one example of spectral transmittance of a color filter. FIG. 15 illustrates one example of each spectral transmission characteristic when an optical filter transmits near-infrared light additionally to visible light, regarding all of R channel, G channel, and B channel. As illustrated in FIG. 15, the RGB optical filter also exhibits high spectral transmittance for near-infrared light having a wavelength of 700 nm or more.

Further, a threshold value may be set for a ratio of an integral value of a spectral transmission characteristic in a wavelength range of near-infrared light in each channel. For example, a ratio of an integral value of each spectral transmission characteristic is a value less than a predetermined threshold value designated by a user.

As described above, a general RGB optical filter exhibits a spectral transmission characteristic of transmitting not only visible light but also near-infrared light regarding all channels or some channels. Thus, in an image captured by a color image sensor, a near-infrared light signal and a visible light color signal are coexistent. In other words, a color of an object captured by a color image sensor may be different from a color of an object sensed by human color perception.

Specifically, when light including near-infrared light is incident on an image sensor, an NIR output signal is added to output signal of each light of R, G, and B. When the NIR output signal is added, a light signal other than visible light may be included, which lowers color reproducibility of an image capturing device.

In order to solve the above-described problem, a general digital camera and a digital video camera ensure highly precise color reproducibility by removing near-infrared light with a near-infrared light cut filter.

There is a demand for capturing of a near-infrared light image using near-infrared light sensitivity of the above-described image sensor. In response to the demand, various methods of performing visible light capturing and near-infrared light capturing with one image capturing device have been considered.

A simplest approach to performing visible light capturing and near-infrared light capturing with one image capturing device is an approach of providing the image capturing device with a mechanism for mechanically moving an infrared light cut filter (IR cut filter) that removes infrared (IR) light. The image capturing device provided with the above-described mechanism captures a visible light video by setting the IR cut filter to an optical system in normal capturing.

Further, in outdoor capturing at night or in capturing in a dark place, the image capturing device captures a near-infrared light image by removing the IR cut filter from the optical system. As described above, visible light capturing and near-infrared light capturing with high color reproducibility are performed with one image capturing device.

Specifically, a normal camera includes, incorporated in an optical system, an IR cut filter exhibiting a spectral transmission characteristic as illustrated in FIG. 16. FIG. 16 is an explanatory diagram illustrating one example of spectral transmittance of an IR cut filter. As illustrated in FIG. 16, the spectral transmittance of the IR cut filter for near-infrared light having a wavelength of 710 nm or more is 0%.

When the IR cut filter as described above is incorporated in an optical system, light from which near-infrared light is removed is incident on an image sensor. With the method described above, highly precise color reproducibility that a color of an object captured by a color image sensor is consistent with a color of an object sensed by human color perception is implemented in capturing.

Further, a method of capturing an RGB image (visible light image) and an NIR image (near-infrared light image) without executing a mechanical operation has been also proposed. For example, PTLs 1 and 3 describe methods of using a four-color optical filter acquired by adding, to an RGB three-color optical filter, an IR transmission filter that removes visible light and transmits IR.

In other words, the methods described in PTLs 1 and 3 acquire an IR signal by providing an IR dedicated pixel. Then, the methods described in PTLs 1 and 3 calculate a correct light signal of each color of R, G, and B, by subtracting, using the acquired IR signal, an amount of contribution of IR from a light signal of each color of R, G, and B output from an image sensor.

With the approach described above, the methods described in PTLs 1 and 3 ensure high color reproducibility. Further, the methods described in PTLs 1 and 3 acquire a monochromatic near-infrared light image, by using the RGB color image sensor as a near-infrared light sensor in capturing in a dark place.

Further, for example, PTL 2 describes a method of detection of light incident on a semiconductor photosensor performed in two parts: detection of visible light and detection of near-infrared light. The detection of visible light is performed by using a three-color optical filter that transmits light of each color of R, G, and B. Note that the three-color optical filter transmits NIR as well.

Then, the detection of NIR is performed by using an NIR sensor provided on a deep part (a part far from a surface) of a photosensor unit for light of each of RGB. The detection performed by the NIR sensor uses a phenomenon that light having a longer wavelength advances to a part farther from a semiconductor surface and is absorbed.

In other words, the method described in PTL 2 detects NIR having passed through a visible light sensing unit, by using an NIR dedicated sensor. One capturing device to which the above-described configuration is applied is able to capture both a visible light image and a near-infrared light image.

CITATION LIST

Patent Literature

[PTL 1] Japanese Unexamined Patent Application Publication No. 2012-227758
[PTL 2] Japanese Unexamined Patent Application Publication No. 2011-243862
[PTL 3] Japanese Unexamined Patent Application Publication No. 2015-204579

SUMMARY OF INVENTION

Technical Problem

The methods described in PTLs 1 and 3 provide an image sensor with an IR dedicated pixel. Thus, when the methods described in PTLs 1 and 3 are applied to an image sensor, the number or area of RGB pixels to be output is decreased, in comparison with the number or area of RGB pixels to be output when an image sensor having identical pixel areas detects only light of three colors of RGB. In other words, when the methods described in PTLs 1 and 3 are applied to an image sensor, there is a problem that resolution or sensitivity is lowered.

Further, the method described in PTL 2 provides an NIR sensor on the deep part of a photosensor unit for light of each of RGB. In other words, when the method described in PTL 2 is applied to a capturing device, a structure of the capturing device becomes complicated, in comparison with a structure of a normal capturing device in which photosensors of one type are arranged on a plane. Thus, there is a problem that a process of manufacturing the capturing device also becomes complicated and a manufacturing cost is increased.

Object of Invention

In view of the above, an object of the present invention is to provide an image processing method, an image processing device, and a storage medium that are able to easily generate a visible light image signal and a near-infrared light image signal respectively from an image signal captured in a wavelength range from visible light to near-infrared light, which solve the above-described problems.

Solution to Problem

An image processing method according to the present invention includes estimating, by using image data and a spectral sensitivity characteristic of a color image sensor in a wavelength range from visible light to near-infrared light, a spectral distribution characteristic of an incident light incident on the color image sensor, based on a model expressing the spectral distribution characteristic of the incident light, the image data including one or more color channels and acquired by capturing, using the color image sensor, the incident light including visible light and near-infrared light; and generating, by using the estimated spectral distribution characteristic of the incident light and the spectral sensitivity characteristic of the color image sensor, visible light image data composed only of information representing visible light and near-infrared light image data composed only of information representing near-infrared light, wherein each integral value of the spectral sensitivity characteristic of the color image sensor in a wavelength range of near-infrared light relating to each of the one or more color channels of the color image sensor satisfies a predetermined condition.

An image processing device according to the present invention includes estimation means for estimating, by using image data and a spectral sensitivity characteristic of a color image sensor in a wavelength range from visible light to near-infrared light, a spectral distribution characteristic of an incident light incident on the color image sensor, based on a model expressing the spectral distribution characteristic of the incident light, the image data including one or more color channels and acquired by capturing, using the color image sensor, the incident light including visible light and near-infrared light; and generation means for generating, by using the estimated spectral distribution characteristic of the incident light and the spectral sensitivity characteristic of the color image sensor, visible light image data composed only of information representing visible light and near-infrared light image data composed only of information representing near-infrared light, wherein each integral value of the spectral sensitivity characteristic of the color image sensor in a wavelength range of near-infrared light relating to each of the one or more color channels of the color image sensor satisfies a predetermined condition.

A non-transitory storage medium according to the present invention records an image processing program. The image processing program causes a computer to execute: estimation processing of estimating, by using image data and a spectral sensitivity characteristic of a color image sensor in a wavelength range from visible light to near-infrared light, a spectral distribution characteristic of an incident light incident on the color image sensor, based on a model expressing the spectral distribution characteristic of the incident light, the image data including one or more color channels and acquired by capturing, using the color image sensor, the incident light including visible light and near-infrared light; and generation processing of generating, by using the estimated spectral distribution characteristic of the incident light and the spectral sensitivity characteristic of the color image sensor, visible light image data composed only of information representing visible light and near-infrared light image data composed only of information representing near-infrared light, wherein each integral value of the spectral sensitivity characteristic of the color image sensor in a wavelength range of near-infrared light relating to each of the one or more color channels of the color image sensor satisfies a predetermined condition.

Advantageous Effects of Invention

The present invention is able to easily generate a visible light image signal and a near-infrared light image signal respectively from an image signal captured in a wavelength range from visible light to near-infrared light.

EXAMPLE EMBODIMENT

First Example Embodiment

[Description of Configuration]

Figure 1:
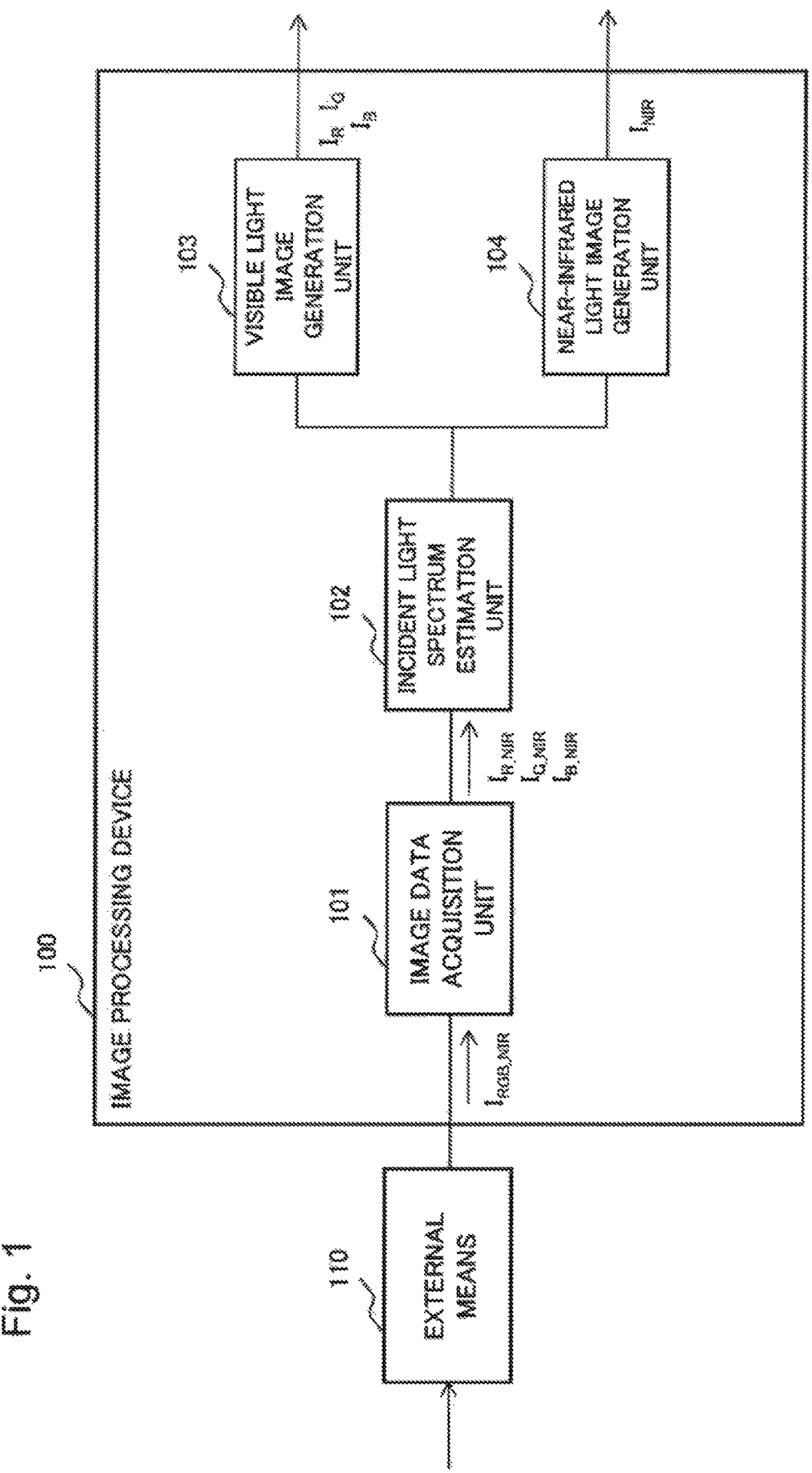
FIG. 1 is a block diagram illustrating a configuration example of a first example embodiment of an image processing device 100 according to the present invention.

Example embodiments of the present invention will be described below with reference to the drawings. FIG. 1 is a block diagram illustrating a configuration example of a first example embodiment of an image processing device 100 according to the present invention.

The image processing device 100 according to the present example embodiment is an image processing device that is simple in configuration and that is able to generate a visible light image signal and a near-infrared light image signal simultaneously from an image signal captured by a color camera in a high-sensitivity capturing mode using near-infrared light, which is used for capturing in a dark place and the like.

Note that the present example embodiment also uses an optical filter exhibiting a spectral transmission characteristic of transmitting not only visible light but also near-infrared light. Further, a ratio of an integral value of a spectral transmission characteristic in a wavelength range of near-infrared light in each channel is a value less than a predetermined threshold value designated by a user.

Further, the image processing device 100 according to the present example embodiment does not use the above-described IR cut filter, but uses image data captured with sufficient use of a spectral sensitivity characteristic of a color image sensor. Thus, color signals of acquired image data include a visible light signal and a near-infrared light signal.

As illustrated in FIG. 1, the image processing device 100 according to the present example embodiment includes an image data acquisition unit 101, an incident light spectrum estimation unit 102, a visible light image generation unit 103, and a near-infrared light image generation unit 104.

Further, as illustrated in FIG. 1, the image processing device 100 is communicably connected with an external means 110. The external means 110 is, for example, an image capturing device such as an image sensor. Further, the external means 110 includes an optical filter incorporated therein.

The image data acquisition unit 101 includes a function of acquiring image data ($I_{RGB\_NIR}$ illustrated in FIG. 1) captured by the external means 110 that exhibits spectral sensitivity of detecting from visible light (VIS) to near-infrared light (NIR). The image data to be acquired may be still image data, or may be moving image data.

The image data to be acquired by the image data acquisition unit 101 of the present example embodiment are composed of M-channel color signals. Note that M is an integer of 1 or greater. Further, each color signal includes both a visible light signal and a near-infrared light signal. Further, a ratio of an integral value of a spectral sensitivity characteristic in a wavelength range of near-infrared light in each channel is a value less than a predetermined threshold value designated by a user.

The image data acquisition unit 101 acquires image data for all pixels. Color information included in the image data is set for the all pixels. As the color information, for example, red (R), green (G), and blue (B), or cyan (C), magenta (M), and yellow (Y) are set. Note that the color information to be set includes information on visible light and information on near-infrared light.

In the present example embodiment, description will be given by assuming that R, G, and B are set as color information included in image data. The image processing device 100 according to the present example embodiment estimates VIS image data and NIR image data respectively from image data in which R, G, and B color information is set for all pixels, and generates each piece of image data.

The image data acquisition unit 101 executes, for example, demosaicing processing in accordance with setting information, and thereby separates the image data $I_{RGB\_NIR}$ into image data $I_{R\_NIR}$, image data $I_{G\_NIR}$, and image data $I_{B\_NIR}$ as illustrated in FIG. 1. The image data acquisition unit 101 inputs the separated image data $I_{R\_NIR}$, the image data $I_{G\_NIR}$, and the image data $I_{B\_NIR}$ to the incident light spectrum estimation unit 102.

Note that the image data $I_{RGB\_NIR}$ are image data of RGB channels in which visible light and near-infrared light are coexistent. The image data $I_{R\_NIR}$ are image data of R channel in which visible light and near-infrared light are coexistent. The image data $I_{G\_NIR}$ are image data of G channel in which visible light and near-infrared light are coexistent. The image data $I_{B\_NIR}$ are image data of B channel in which visible light and near-infrared light are coexistent.

Note that, the image data acquisition unit 101 itself may acquire image data of RGB channels by capturing, using a color image sensor, incident light including visible light and near-infrared light.

The incident light spectrum estimation unit 102 includes a function of estimating a spectral distribution characteristic (spectrum) of light incident on each pixel composing acquired image data.

The incident light spectrum estimation unit 102 estimates the spectral distribution characteristic of incident light from image data, by using a spectral sensitivity characteristic of the external means 110. The spectrum of incident light estimated by the incident light spectrum estimation unit 102 is associated with light from a wavelength range of visible light to a wavelength range of near-infrared light.

The visible light image generation unit 103 includes a function of generating a visible light image ($I_R$, $I_G$, and $I_B$ illustrated in FIG. 1) including only visible light signals, by using the estimated spectrum of light incident on each pixel composing image data and the spectral sensitivity characteristic of the external means 110.

The near-infrared light image generation unit 104 includes a function of generating a near-infrared light image ($I_{NIR}$ illustrated in FIG. 1) including only near-infrared light signals, by using the estimated spectrum of light incident on each pixel composing image data and the spectral sensitivity characteristic of the external means 110.

Hereinafter, spectral distribution characteristic estimation processing performed by the incident light spectrum estimation unit 102 of the present example embodiment will be described. It is assumed that a spectral sensitivity characteristic of R channel of a color image sensor is $C_R(\lambda)$, a spectral sensitivity characteristic of G channel is $C_G(\lambda)$, a spectral sensitivity characteristic of B channel is $C_B(\lambda)$, and a spectral distribution characteristic of light incident on a pixel composing image data output by the color image sensor is $E(\lambda)$, respectively.

The color image sensor exhibits sensitivity to a wavelength range of near-infrared light regarding all of the respective channels. Moreover, a ratio of an integral value of a spectral sensitivity characteristic in a wavelength range of near-infrared light in each channel is a value less than a predetermined threshold value designated by a user. Three color signals R, G, and B of a pixel on which light is incident are respectively represented as follows.

[Mathematical 1]

$$R = \int E(\lambda) C_R(\lambda) d\lambda$$

$$G = \int E(\lambda) C_G(\lambda) d\lambda$$

$$B = \int E(\lambda) C_B(\lambda) d\lambda \qquad \text{Equation (1)}$$

$\lambda$ in Equation (1) represents a wavelength of light. A value of $\lambda$ takes any value in a wavelength range to which a color image sensor exhibits sensitivity.

Further, each of spectral sensitivity characteristics $C_R(\lambda)$, $C_G(\lambda)$, and $C_B(\lambda)$ of a color image sensor in Equation (1) is a product of a spectral sensitivity characteristic of the image sensor by each spectral transmission characteristic of an RGB optical filter, and is a known function. In Equation (1), integration is performed over a wavelength range to which a color image sensor exhibits sensitivity.

In order to calculate the spectral distribution characteristic $E(\lambda)$ of incident light on the basis of color signals R, G, and B in image data by using Equation (1), the present example embodiment adopts a model that expresses a spectral distribution characteristic of incident light, which is continuous data being originally infinite-dimensional with respect to a wavelength, with a relatively small number of parameters.

A spectral distribution characteristic of incident light may be modeled by a weighted sum of basis vectors $r_i(\lambda)$ (i=1 to M) of the spectral distribution characteristic, or may be modeled by a weighted sum of basis vectors $r_i(\lambda)$ (i=1 to M+1), with use of a relatively small number of parameters. Furthermore, a mean vector $r_0(\lambda)$ may be added to the model.

First, description will be given to a case in which a spectral distribution characteristic of incident light is modeled by the mean vector $r_0(\lambda)$ and the basis vectors $r_i(\lambda)$ (i=1 to M). A spectral distribution characteristic is modeled by a sum of the mean vector and the weighted sum of the basis vectors, as illustrated in Equation (2).

[Mathematical 2]

$$E(\lambda) = r_0(\lambda) + \Sigma_{i=1}^{M} a_i * r_i(\lambda) \qquad \text{Equation (2)}$$

Note that a basis vector $r_i(\lambda)$ (i=1 to 3) in Equation (2) is a function capable of sufficiently expressing the spectral distribution characteristic $E(\lambda)$ of incident light with a small number of parameters. The basis vector $r_i(\lambda)$ can be acquired by performing principal component analysis on a spectral space formed by a product of a spectral distribution characteristic of a light source by a surface reflectance of an object. Further, a coefficient $a_i$ in Equation (2) is a parameter used for expressing the spectral distribution characteristic $E(\lambda)$ of incident light.

Figure 2:
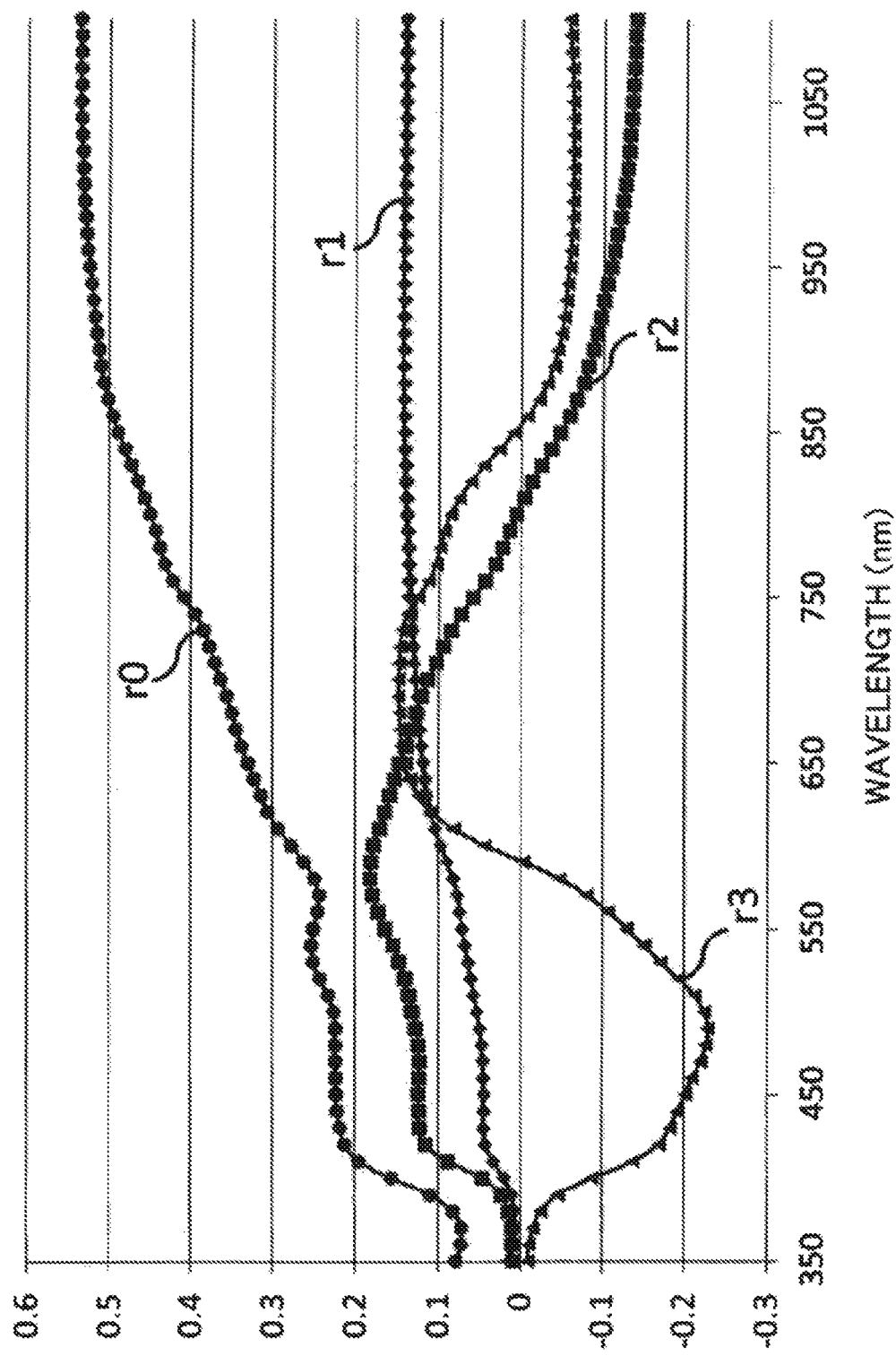
FIG. 2 is an explanatory diagram illustrating one example of a mean vector and basis vectors of incident light.

FIG. 2 is an explanatory diagram illustrating one example of a mean vector and basis vectors of incident light. FIG. 2 illustrates a mean vector $r_0(\lambda)$ and basis vectors $r_1(\lambda)$ to $r_3(\lambda)$.

When Equation (2) is substituted into Equation (1), observation equations relating to an unknown parameter $a_i$ are generated as follows.

[Mathematical 3]

$$R = \int (r_0(\lambda) + \Sigma_{i=1}^{M} a_i r_i(\lambda)) C_R(\lambda) d\lambda$$

$$G = \int (r_0(\lambda) + \Sigma_{i=1}^{M} a_i r_i(\lambda)) C_G(\lambda) d\lambda$$

$$B = \int (r_0(\lambda) + \Sigma_{i=1}^{M} a_i r_i(\lambda)) C_B(\lambda) d\lambda \qquad \text{Equation (3)}$$

Note that, a right side of Equation (3) originally needs an integral coefficient, but the integral coefficient is omitted in the present example embodiment for simplification of description.

Integral calculation in Equation (3) may be approximated by summation calculation as indicated below.

[Mathematical 4]

$$R \approx \Sigma_{\lambda=400}^{1000}((r_0(\lambda)+\Sigma_{i=1}^{M}a_i r_i(\lambda))C_R(\lambda))$$

$$G \approx \Sigma_{\lambda=400}^{1000}((r_0(\lambda)+\Sigma_{i=1}^{M}a_i r_i(\lambda))C_G(\lambda))$$

$$B \approx \Sigma_{\lambda=400}^{1000}((r_0(\lambda)+\Sigma_{i=1}^{M}a_i r_i(\lambda))C_B(\lambda)) \quad \text{Equation (4)}$$

Note that, in Equation (4), a sum is calculated in accordance with a spectral sensitivity characteristic of a color image sensor over a wavelength range from 400 nm to 1000 nm.

When an RGB value of image data is acquired, the observation equations in Equation (3) become a simultaneous linear equation with M unknowns relating to the unknown parameter $a_i$. In other words, it becomes possible to find the unknown parameter $a_i$.

When the parameter $a_i$ acquired from Equation (4) is substituted into Equation (2), the incident light spectrum estimation unit 102 is able to reconstruct a spectral distribution characteristic $E(\lambda)$ of light incident on a concerned pixel in image data.

By finding solutions of observation equations such as Equation (4) for all pixels composing image data, the incident light spectrum estimation unit 102 is able to calculate a spectral distribution characteristic $E(\lambda)$ of incident light regarding the all pixels.

In the above, description has been given to the case in which a spectral distribution characteristic of incident light is modeled by a mean vector $r_0(\lambda)$ and basis vectors $r_i(\lambda)$ (i=1 to M). Note that a spectral distribution characteristic of incident light may be modeled by a mean vector $r_0(\lambda)$ and basis vectors $r_i(\lambda)$ (i=1 to M+1) in which one basis vector is added. When the basis vectors $r_i(\lambda)$ (i=1 to M+1) are used, a spectral distribution characteristic is represented as indicated in Equation (5).

[Mathematical 5]

$$E(\lambda)=r_0(\lambda)+\Sigma_{i=1}^{M+1}a_i * r_i(\lambda) \quad \text{Equation (5)}$$

Similarly, observation equations are generated from Equation (5) as follows.

[Mathematical 6]

$$R \approx \Sigma_{\lambda=400}^{1000}((r_0(\lambda)+\Sigma_{i=1}^{M+1}a_i r_i(\lambda))C_R(\lambda))$$

$$G \approx \Sigma_{\lambda=400}^{1000}((r_0(\lambda)+\Sigma_{i=1}^{M+1}a_i r_i(\lambda))C_G(\lambda))$$

$$B \approx \Sigma_{\lambda=400}^{1000}((r_0(\lambda)+\Sigma_{i=1}^{M+1}a_i r_i(\lambda))C_B(\lambda)) \quad \text{Equation (6)}$$

In Equation (6), there are (M+1) unknown parameters $a_i$ being coefficients of the basis vectors $r_i(\lambda)$ (i=1 to M+1). In other words, Equation (6) is in an under-determinant state where there are more unknown parameters than M that is the number of the observation equations, for which unknown parameters $a_i$ cannot be analytically calculated. In order to solve the above problem, a coefficient $a_1$ of a first basis vector $r_1(\lambda)$ is calculated in advance by another method.

One example of a method of calculating a coefficient $a_1$ will be described. As illustrated in FIG. 2, a first basis vector $r_1(\lambda)$ of incident light is generally a direct-current component. In other words, a coefficient of a first basis vector $r_1(\lambda)$ is equivalent to a coefficient for representing intensity of incident light. Thus, estimation is made that a sum of M-channel image data is highly correlated with the coefficient of the first basis vector $r_1(\lambda)$.

When attention is paid to the above property, for example, a regression equation relating to a sum of M-channel image data and a coefficient $a_1$ of a basis vector $r_1(\lambda)$ is acquired by single regression analysis. When the sum of the M-channel image data is substituted into the acquired regression equation, the coefficient $a_1$ of the basis vector $r_1(\lambda)$ is acquired.

When $a_1$ calculated by the above method is substituted into Equation (6), the problem of under-determinant is solved. In other words, the observation equations indicated in Equation (6) become a simultaneous linear equation with M unknowns, allowing the remaining unknown parameters $a_i$ to be acquired.

When the parameter $a_i$ acquired as described above is substituted into Equation (5), the incident light spectrum estimation unit 102 is able to reconstruct a spectral distribution characteristic $E(\lambda)$ of light incident on a concerned pixel in image data.

Hereinafter, visible light image generation processing performed by the visible light image generation unit 103 of the present example embodiment will be described. The visible light image generation unit 103 uses spectral sensitivity characteristics $C_{R,VIS}(\lambda)$, $C_{G,VIS}(\lambda)$, and $C_{B,VIS}(\lambda)$ in only a visible light wavelength, out of spectral sensitivity characteristics $C_R(\lambda)$, $C_G(\lambda)$, and $C_B(\lambda)$ of a color image sensor. Note that the visible light wavelength is a wavelength range that is approximately from 400 nm to 700 nm.

The visible light image generation unit 103 generates, by using a spectral distribution characteristic $E(\lambda)$ of incident light acquired by the incident light spectrum estimation unit 102 and spectral sensitivity characteristics $C_{R,VIS}(\lambda)$, $C_{G,VIS}(\lambda)$, and $C_{B,VIS}(\lambda)$, color signals $R_{VIS}$, $G_{VIS}$, and $B_{VIS}$ including only visible light signals respectively as follows.

[Mathematical 7]

$$R_{VIS}=\Sigma_{\lambda=400}^{700}((r_0(\lambda)+\Sigma_{i=1}^{M}a_i r_i(\lambda))C_{R,VIS}(\lambda))$$

$$G_{VIS}=\Sigma_{\lambda=400}^{700}((r_0(\lambda)+\Sigma_{i=1}^{M}a_i r_i(\lambda))C_{G,VIS}(\lambda))$$

$$B_{VIS}=\Sigma_{\lambda=400}^{700}((r_0(\lambda)+\Sigma_{i=1}^{M}a_i r_i(\lambda))C_{B,VIS}(\lambda)) \quad \text{Equation (7)}$$

By respectively calculating the color signals $R_{VIS}$, $G_{VIS}$, and $B_{VIS}$ including only visible light signals for all pixels composing image data, the visible light image generation unit 103 is able to generate image data $I_R$, $I_G$, and $I_B$ including only visible light signals.

Hereinafter, near-infrared light image generation processing performed by the near-infrared light image generation unit 104 of the present example embodiment will be described. The near-infrared light image generation unit 104 uses spectral sensitivity characteristics $C_{R,NIR}(\lambda)$, $C_{G,NIR}(\lambda)$, and $C_{B,NIR}(\lambda)$ in only a near-infrared light wavelength, out of spectral sensitivity characteristics $C_R(\lambda)$, $C_G(\lambda)$, and $C_B(\lambda)$ of a color image sensor. Note that the near-infrared light wavelength is a wavelength range that is approximately from 700 nm to 1000 nm.

The near-infrared light image generation unit 104 generates, by using a spectral distribution characteristic $E(\lambda)$ of incident light acquired by the incident light spectrum estimation unit 102 and spectral sensitivity characteristics $C_{R,NIR}(\lambda)$, $C_{G,NIR}(\lambda)$, and $C_{B,NIR}(\lambda)$, signals $R_{NIR}$, $G_{NIR}$, and $B_{NIR}$ including only near-infrared light signals respectively as follows.

[Mathematical 8]

$$R_{NIR} = \Sigma_{\lambda=700}^{1000}((r_0(\lambda) + \Sigma_{i=1}^{M} a_i r_i(\lambda)) C_{R,NIR}(\lambda))$$

$$G_{NIR} = \Sigma_{\lambda=700}^{1000}((r_0(\lambda) + \Sigma_{i=1}^{M} a_i r_i(\lambda)) C_{G,NIR}(\lambda))$$

$$B_{NIR} = \Sigma_{\lambda=700}^{1000}((r_0(\lambda) + \Sigma_{i=1}^{M} a_i r_i(\lambda)) C_{B,NIR}(\lambda)) \quad \text{Equation (8)}$$

The near-infrared light image generation unit 104 respectively calculates the signals $R_{NIR}$, $G_{NIR}$, and $B_{NIR}$ including only near-infrared light signals for all pixels composing image data. Then, the near-infrared light image generation unit 104 adds up the acquired signals $R_{NIR}$, $G_{NIR}$, and $B_{NIR}$ regarding each pixel, records an addition result, and is thereby able to generate image data $I_{NIR}$ including only near-infrared light signals.

Note that, since a user designates a ratio of an integral value of a spectral sensitivity characteristic in a wavelength range of near-infrared light in each channel, for example, $R_{NIR}/G_{NIR}$ or $R_{NIR}/B_{NIR}$, which is a ratio of signals, takes a value less than a predetermined value. In other words, a ratio of signals composing image data $I_{NIR}$ is adjusted.

[Description of Operation]

Figure 3:
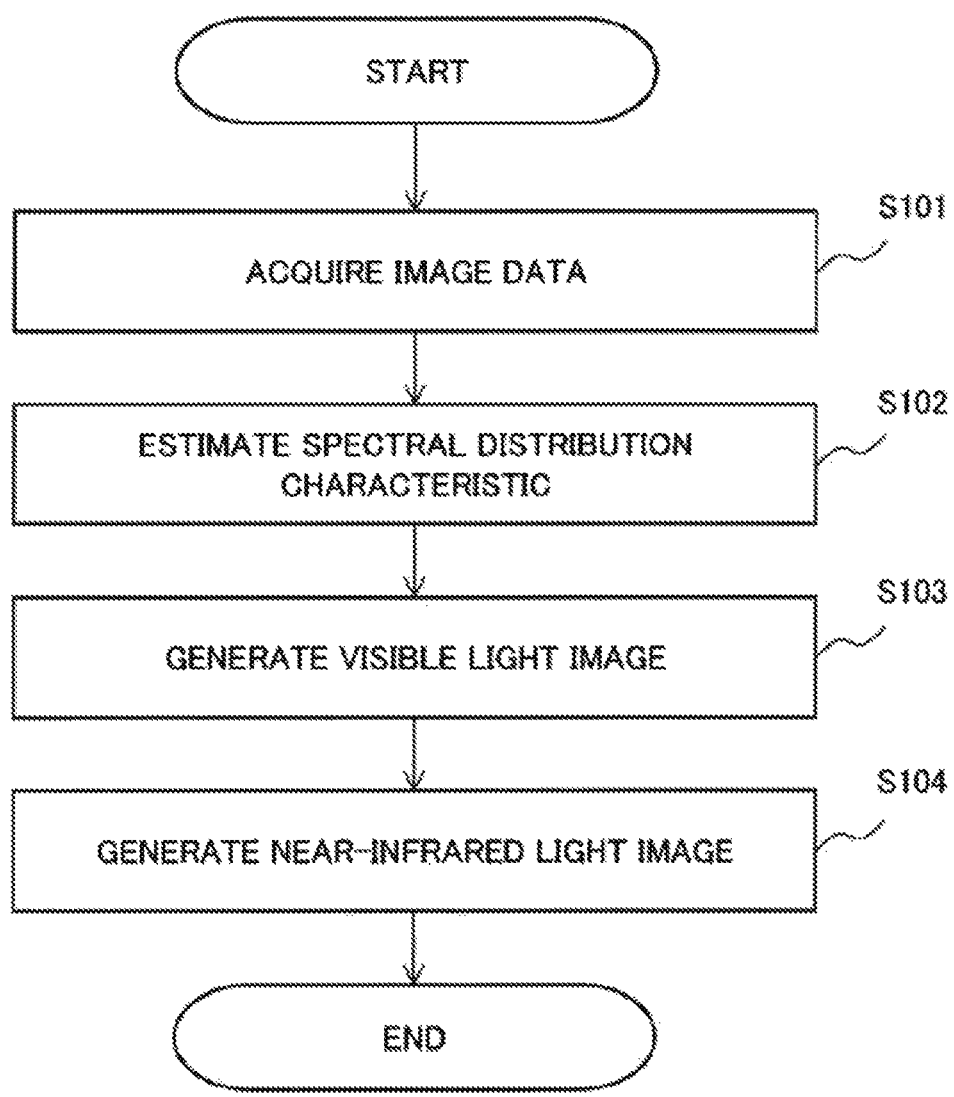
FIG. 3 is a flowchart illustrating an operation of image generation processing performed by the image processing device 100 according to the first example embodiment.

An operation of generating a visible light image and a near-infrared light image performed by the image processing device 100 according to the present example embodiment will be described below with reference to FIG. 3. FIG. 3 is a flowchart illustrating an operation of image generation processing performed by the image processing device 100 of the first example embodiment.

As illustrated in FIG. 3, first, the image data acquisition unit 101 acquires image data $I_{RGB\_NIR}$ captured by the external means 110 (Step S101). The image data acquisition unit 101 processes the acquired image data, and inputs the processed image data $I_{R\_NIR}$, $I_{G\_NIR}$, and $I_{B\_NIR}$ to the incident light spectrum estimation unit 102.

Then, the incident light spectrum estimation unit 102 estimates a spectral distribution characteristic $E(\lambda)$ of light incident on a pixel in the acquired image data, by using spectral sensitivity characteristics $C_R(\lambda)$, $C_G(\lambda)$, and $C_B(\lambda)$ of a color image sensor of the external means 110 (Step S102).

The incident light spectrum estimation unit 102 estimates a spectral distribution characteristic $E(\lambda)$ regarding all pixels composing the image data. The incident light spectrum estimation unit 102 inputs the estimated spectral distribution characteristic $E(\lambda)$ to the visible light image generation unit 103 and the near-infrared light image generation unit 104.

Then, the visible light image generation unit 103 calculates color signals $R_{VIS}$, $G_{VIS}$, and $B_{VIS}$ including only visible light signals, by using the input spectral distribution characteristic $E(\lambda)$ and spectral sensitivity characteristics $C_{R,VIS}(\lambda)$, $C_{G,VIS}(\lambda)$, and $C_{B,VIS}(\lambda)$ in only a visible light wavelength. Then, the visible light image generation unit 103 generates visible light images $I_R$, $I_G$, and $I_B$ on the basis of the calculated color signals (Step S103).

Then, the near-infrared light image generation unit 104 calculates signals $R_{NIR}$, $G_{NIR}$, and $B_{NIR}$ including only near-infrared light signals, by using the input spectral distribution characteristic $E(\lambda)$ and spectral sensitivity characteristics $C_{R,NIR}(\lambda)$, $C_{G,NIR}(\lambda)$, and $C_{B,NIR}(\lambda)$ in only a near-infrared light wavelength.

Then, the near-infrared light image generation unit 104 generates a near-infrared light image $I_{NIR}$ on the basis of the calculated signals (Step S104). After generating the near-infrared light image $I_{NIR}$, the image processing device 100 ends the image generation processing.

[Description of Advantageous Effect]

The image processing device 100 according to the present example embodiment is able to acquire image data including only visible light signals and image data including only near-infrared light signals, by using a spectral sensitivity characteristic of a color image sensor exhibiting sensitivity from visible light to near-infrared light and RGB image data including near-infrared light signals captured by the color image sensor.

Specifically, the image data acquisition unit 101 of the present example embodiment acquires, from a color image sensor exhibiting sensitivity from visible light to near-infrared light and outputting a color image in which visible light is captured, M-channel color images in which not only visible light but also near-infrared light are captured.

The above-described color image sensor exhibits sensitivity to a wavelength range of near-infrared light regarding each channel. A ratio of an integral value of a spectral sensitivity characteristic in a wavelength range of near-infrared light in each channel is a value less than a predetermined threshold value designated by a user.

Then, the incident light spectrum estimation unit 102 reconstructs a spectral distribution characteristic of incident light, by using a color signal to be acquired from the acquired M-channel color images, a spectral sensitivity characteristic of the color image sensor, and a mean vector and M basis vectors expressing the spectral distribution characteristic of incident light. Note that the incident light spectrum estimation unit 102 may reconstruct a spectral distribution characteristic of incident light by using (M+1) basis vectors.

Then, the visible light image generation unit 103 generates a visible light image composed only of visible light signals, by using the reconstructed spectral distribution characteristic of incident light and the spectral sensitivity characteristic of the color image sensor. Further, the near-infrared light image generation unit 104 generates a near-infrared light image composed only of near-infrared light signals, by using the reconstructed spectral distribution characteristic of incident light and the spectral sensitivity characteristic of the color image sensor.

The methods described in PTLs 1 to 3 acquire a visible light image and a near-infrared light image by using a special mechanical configuration or a special image sensor, as described above.

The image processing device 100 according to the present example embodiment is able to acquire a visible light image and a near-infrared light image in a simple manner, with use of only a configuration of a general capturing device, rather than use of a special mechanical configuration or a special image sensor. The reason is that the incident light spectrum estimation unit 102 estimates a spectral distribution characteristic $E(\lambda)$ of incident light by using a spectral sensitivity characteristic of a color image sensor and image data captured by the color image sensor.

Second Example Embodiment

[Description of Configuration]

Figure 4:
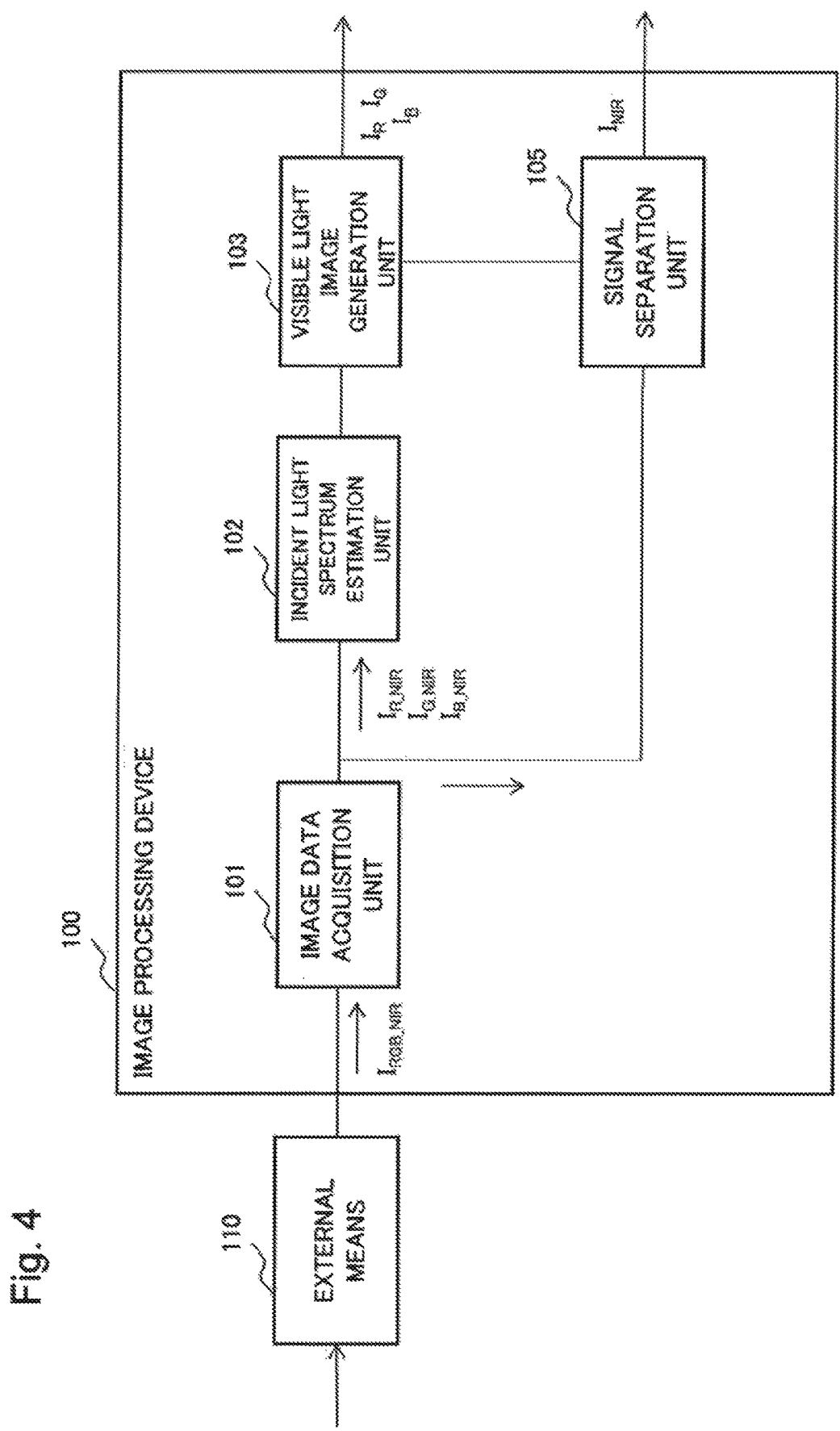
FIG. 4 is a block diagram illustrating a configuration example of a second example embodiment of an image processing device 100 according to the present invention.

Next, a second example embodiment of the present invention will be described with reference to the drawings. FIG. 4 is a block diagram illustrating a configuration example of the second example embodiment of an image processing device 100 according to the present invention.

As illustrated in FIG. 4, the image processing device 100 according to the present example embodiment includes an image data acquisition unit 101, an incident light spectrum estimation unit 102, a visible light image generation unit 103, and a signal separation unit 105. Configurations in the second example embodiment other than the image data acquisition unit 101 and the signal separation unit 105 are similar to the configurations in the first example embodiment.

The image data acquisition unit 101 includes a function of acquiring image data ($I_{RGB\_NIR}$ illustrated in FIG. 4) captured by an external means 110 that exhibits spectral sensitivity of detecting from visible light (VIS) to near-infrared light (NIR).

The image data to be acquired by the image data acquisition unit 101 of the present example embodiment are composed of a plurality of color signals. Each color signal composing the image data includes both a visible light signal and a near-infrared light signal.

Further, a ratio of near-infrared light signals of each color channel included in the image data to be acquired by the image data acquisition unit 101 is a value less than a predetermined threshold value designated by a user.

The image data acquisition unit 101 separates the image data $I_{RGB\_NIR}$ into image data $I_{R\_NIR}$, image data $I_{G\_NIR}$, and image data $I_{B\_NIR}$, respectively. The image data acquisition unit 101 inputs the separated image data $I_{R\_NIR}$, the image data $I_{G\_NIR}$, and the image data $I_{B\_NIR}$ to the incident light spectrum estimation unit 102.

The incident light spectrum estimation unit 102 includes a function of estimating, on the basis of image data, a spectral distribution characteristic (spectrum) of light incident on each pixel composing the image data, by using a spectral sensitivity characteristic of the external means 110. The spectrum of incident light estimated by the incident light spectrum estimation unit 102 includes from a wavelength range of visible light to a wavelength range of near-infrared light.

The visible light image generation unit 103 includes a function of generating a visible light image ($I_R$, $I_G$, and $I_B$ illustrated in FIG. 4) including only visible light signals, by using an estimated spectrum of light incident on each pixel composing image data and a spectral sensitivity characteristic of the external means 110.

The signal separation unit 105 includes a function of outputting, by using two types of image data to be input, first image data and second image data image data acquired by subtracting the second image data from the first image data.

In the example illustrated in FIG. 4, the first image data to be input to the signal separation unit 105 are $I_{R\_NIR}$, $I_{G\_NIR}$, and $I_{B\_NIR}$ output from the image data acquisition unit 101. Further, the second image data to be input to the signal separation unit 105 are $I_R$, $I_G$, and $I_B$ output from the visible light image generation unit 103.

Thus, the signal separation unit 105 generates a near-infrared light image $I_{NIR}$ including only near-infrared light signals, by subtracting $I_R$ from $I_{R\_NIR}$, $I_G$ from $I_{G\_NIR}$, and $I_B$ from $I_{B\_NIR}$, respectively.

Figure 5:
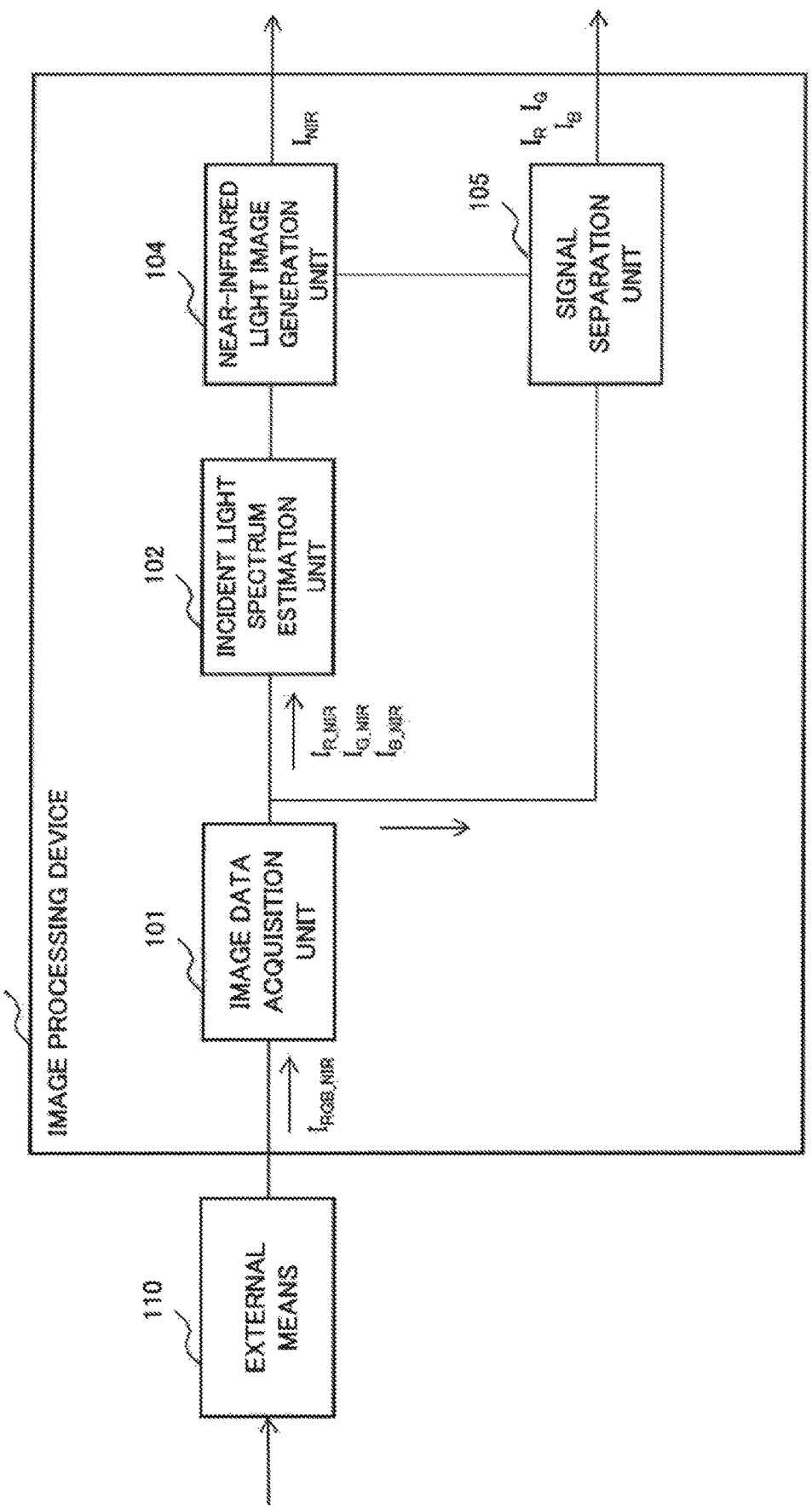
FIG. 5 is a block diagram illustrating another configuration example of the second example embodiment of the image processing device 100 according to the present invention.

FIG. 5 is a block diagram illustrating another configuration example of the second example embodiment of the image processing device 100 according to the present invention. FIG. 5 illustrates the image processing device 100 of a case in which the visible light image generation unit 103 of the image processing device 100 illustrated in FIG. 4 is replaced with the near-infrared light image generation unit 104.

The near-infrared light image generation unit 104 includes a function of generating a near-infrared light image ($I_{NIR}$ illustrated in FIG. 5) including only near-infrared light signals, by using a spectrum of light incident on each pixel composing estimated image data and a spectral sensitivity characteristic of the external means 110.

In the example illustrated in FIG. 5, the first image data to be input to the signal separation unit 105 are $I_{R\_NIR}$, $I_{G\_NIR}$, and $I_{B\_NIR}$ output from the image data acquisition unit 101. Further, the second image data to be input to the signal separation unit 105 are $I_{NIR}$ output from the near-infrared light image generation unit 104.

Thus, the signal separation unit 105 respectively generates visible light images $I_R$, $I_G$, and $I_B$ including only visible light signals, by subtracting $I_{NIR}$ from $I_{R\_NIR}$, $I_{NIR}$ from $I_{G\_NIR}$, and $I_{NIR}$ from $I_{B\_NIR}$, respectively.

[Description of Operation]

Figure 6:
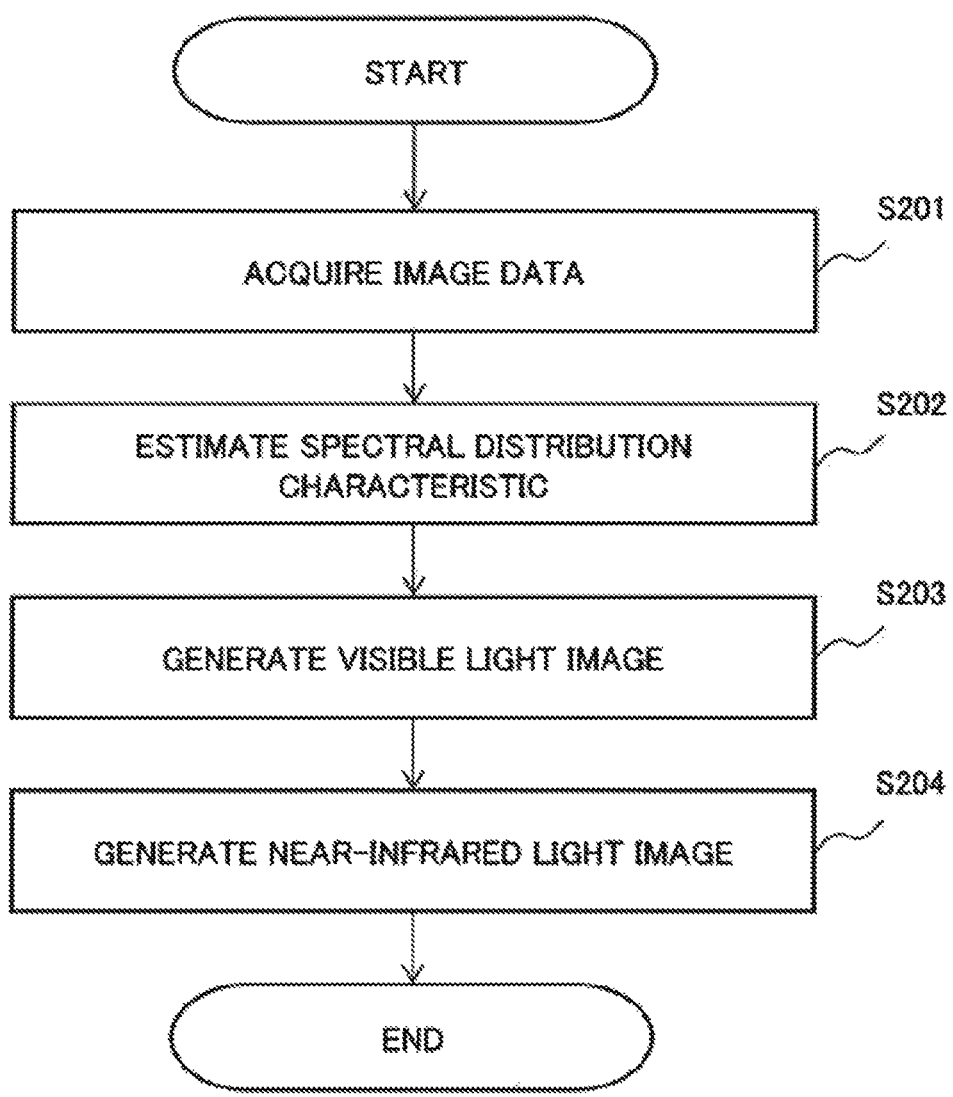
FIG. 6 is a flowchart illustrating an operation of image generation processing performed by the image processing device 100 according to the second example embodiment.

Hereinafter, an operation of generating a visible light image and a near-infrared light image performed by the image processing device 100 according to the present example embodiment will be described with reference to FIG. 6. FIG. 6 is a flowchart illustrating an operation of image generation processing performed by the image processing device 100 according to the second example embodiment. Note that the image generation processing illustrated in FIG. 6 is executed by the image processing device 100 illustrated in FIG. 4.

Processing of Steps S201 to S203 illustrated in FIG. 6 is similar to processing of Steps S101 to S103 illustrated in FIG. 3, which have been described in the first example embodiment.

As illustrated in FIG. 4, image data $I_{R\_NIR}$, $I_{G\_NIR}$, and $I_{B\_NIR}$ are input to the signal separation unit 105 from the image data acquisition unit 101. Further, visible light images $I_R$, $I_G$, and $I_B$ are input to the signal separation unit 105 from the visible light image generation unit 103.

As illustrated in FIG. 6, the signal separation unit 105 subtracts $I_R$ from $I_{R\_NIR}$, $I_G$ from $I_{G\_NIR}$, and $I_B$ from $I_{B\_NIR}$, respectively, adds up image data generated as a result of subtraction, and thereby generates a near-infrared light image $I_{NIR}$ (Step S204).

After generating the near-infrared light image $I_{NIR}$, the image processing device 100 ends the image generation processing. Note that, the image processing device 100 illustrated in FIG. 5 generates a visible light image, by also performing the same operation as the image generation processing illustrated in FIG. 6, except that order of generation of a visible light image and generation of a near-infrared light image is swapped.

[Description of Advantageous Effect]

The image processing device 100 of the present example embodiment is able to reduce a generation cost of a visible light image and a near-infrared light image, in comparison with the image processing device 100 of the first example embodiment. The reason is that one image is generated by the signal separation unit 105 subtracting another image from image data.

Third Example Embodiment

[Description of Configuration]

Figure 7:
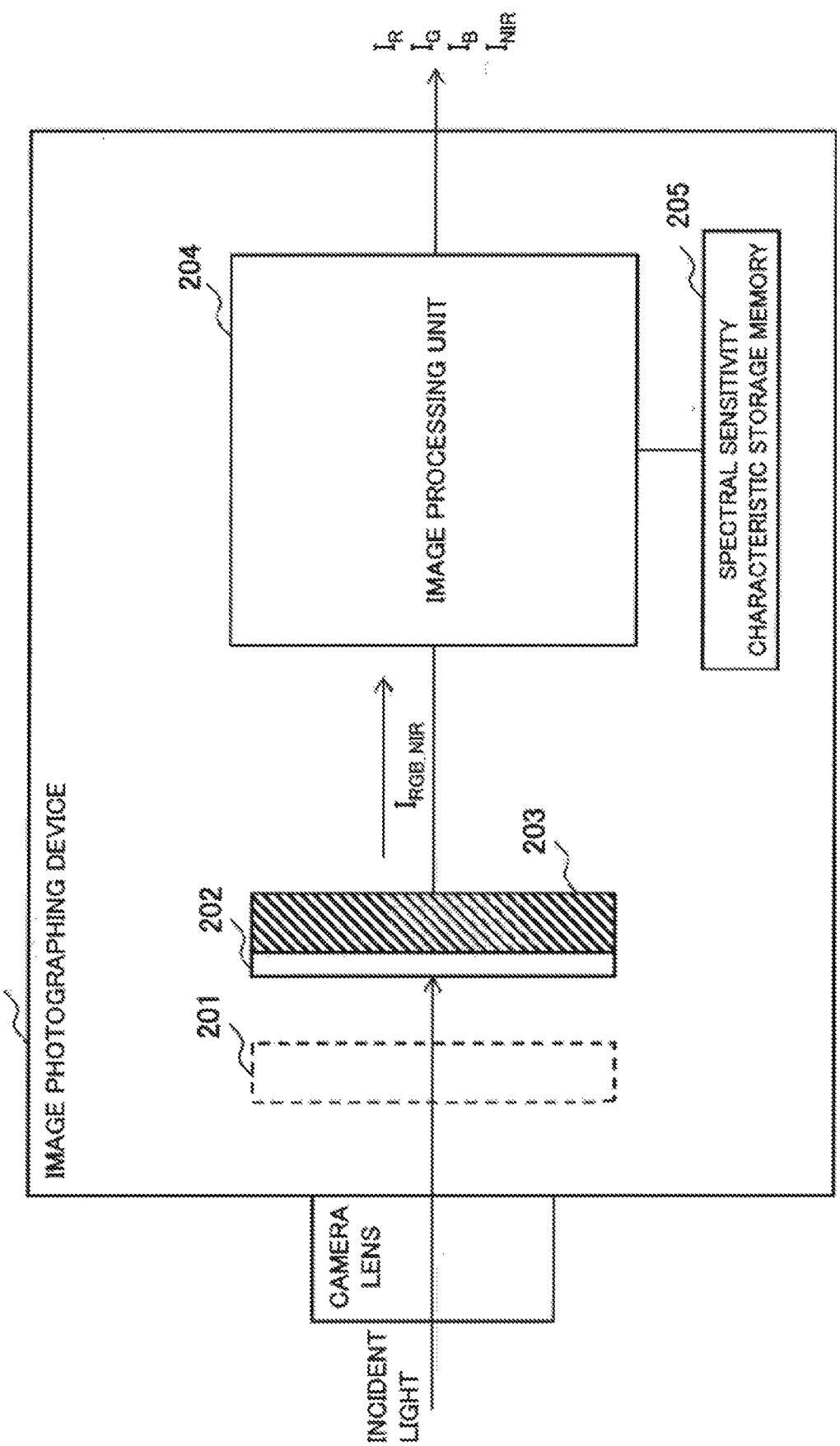
FIG. 7 is a block diagram illustrating a configuration example of a third example embodiment of an image capturing device 200 according to the present invention.

Next, a third example embodiment of the present invention will be described with reference to the drawings. FIG. 7 is a block diagram illustrating a configuration example of the third example embodiment of an image capturing device 200 according to the present invention.

As illustrated in FIG. 7, the image capturing device 200 according to the present example embodiment is constituted by an optical filter 202, a photosensor 203, an image processing unit 204, and a spectral sensitivity characteristic storage memory 205.

Note that the image capturing device 200 of the present example embodiment is an image capturing device from which an infrared light cut filter (IR cut filter) 201 mounted on a normal image capturing device is removed, or an image capturing device on which the infrared light cut filter 201 is not mounted from the beginning.

A dashed rectangle illustrated in FIG. 7 is equivalent to the infrared light cut filter 201 mounted on a normal image capturing device. Note that, in the present example embodiment, no component is present at a location indicated by the dashed rectangle.

For a camera lens illustrated in FIG. 7, a normal camera lens may be used. Further, for the optical filter 202 and the photosensor 203, an optical filter and a photosensor generally used in a color image input device or an image capturing device may be respectively used.

Figure 15:
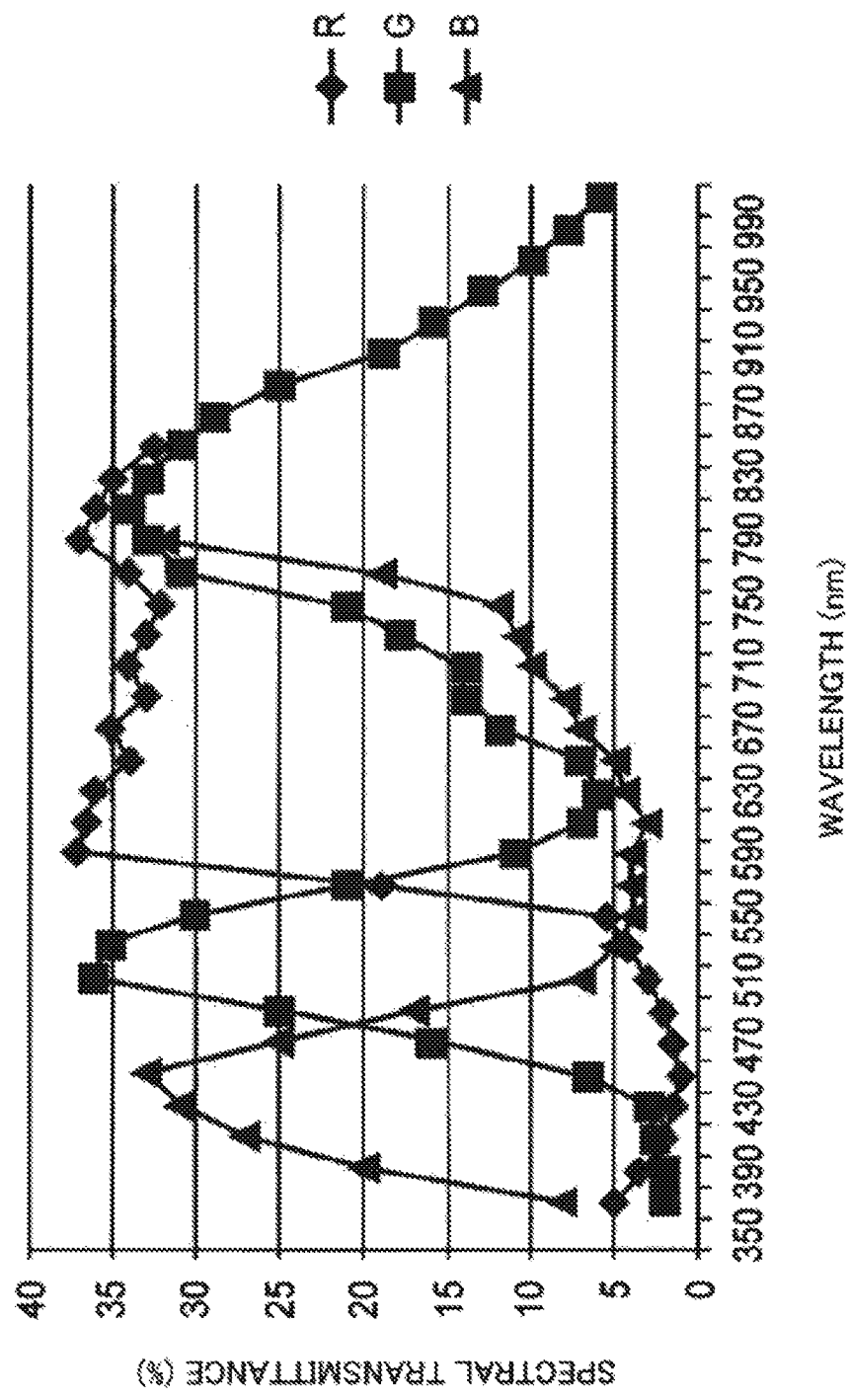
FIG. 15 is an explanatory diagram illustrating one example of spectral transmittance of a color filter.
Figure 16:
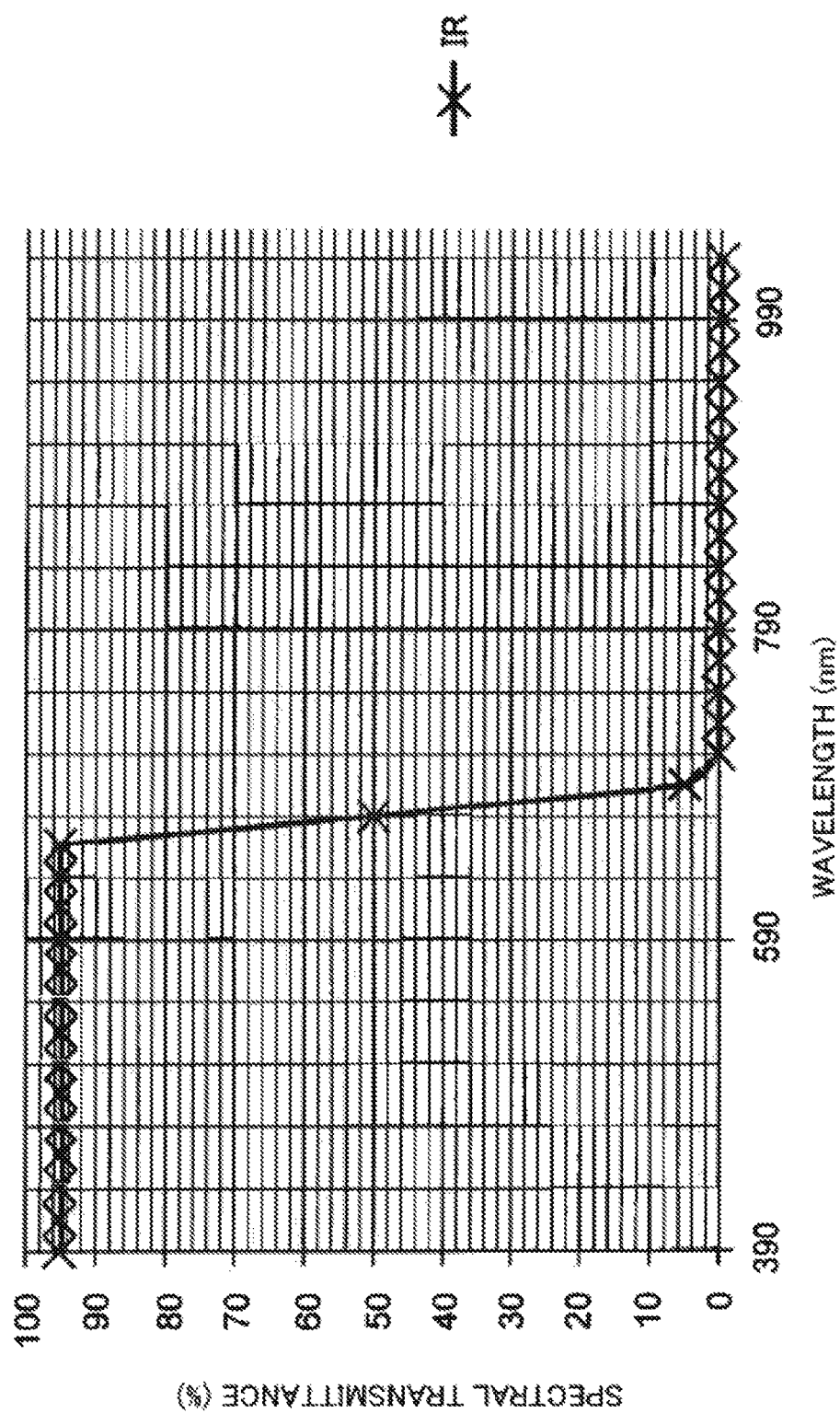
FIG. 16 is an explanatory diagram illustrating one example of spectral transmittance of an IR cut filter.

In other words, a spectral transmission characteristic of the optical filter 202 is similar to, for example, the spectral transmission characteristic illustrated in FIG. 16. Further, a spectral transmission characteristic of the photosensor 203 is similar to, for example, the spectral transmission characteristic illustrated in FIG. 15.

Further, a ratio of an integral value of a spectral sensitivity characteristic in a wavelength range of near-infrared light in each channel of the photosensor 203 is a value less than a predetermined threshold value designated by a user.

Figure 8:
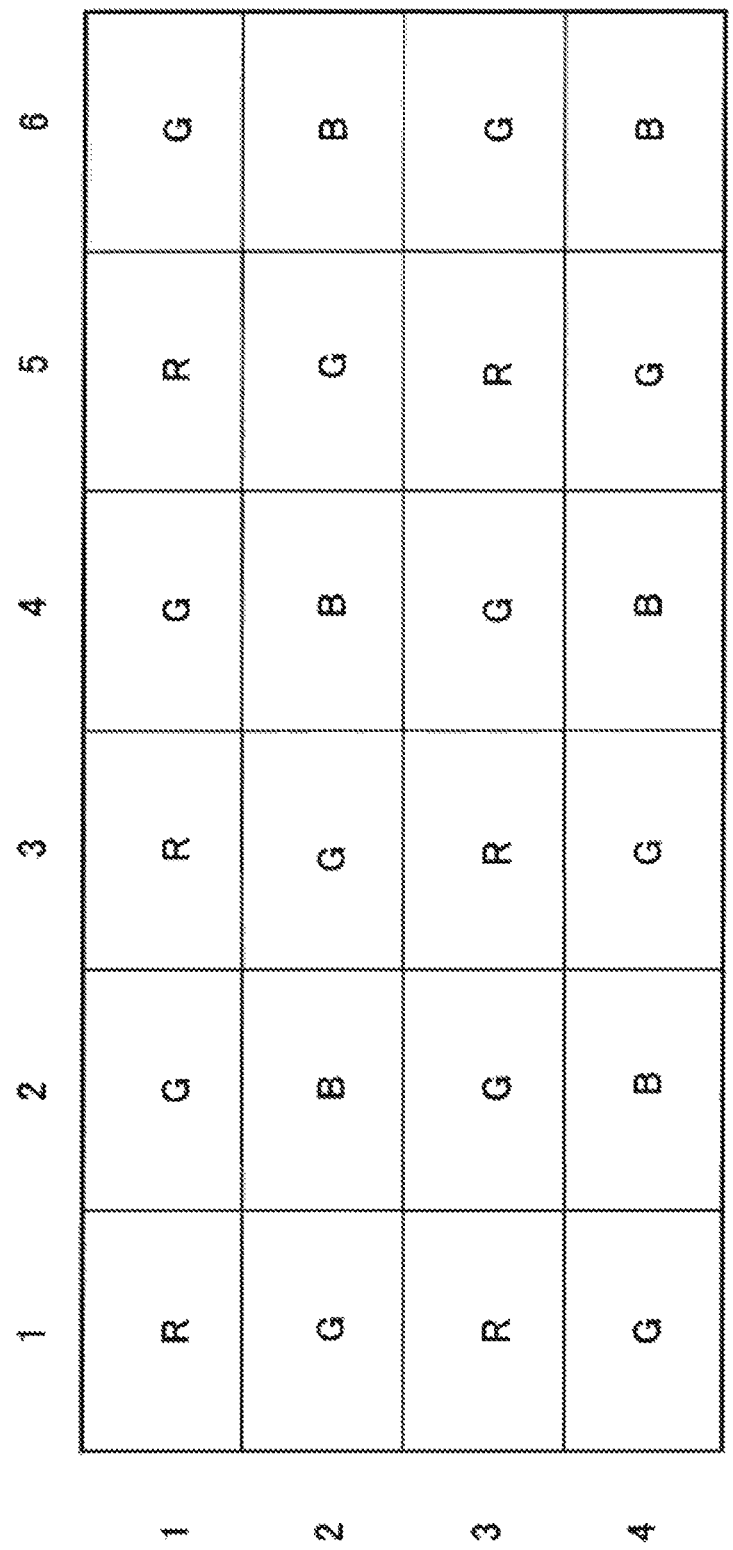
FIG. 8 is a plan view illustrating one example of a photosensor array in which a Bayer array type color filter is incorporated.

FIG. 8 is a plan view illustrating one example of a photosensor array in which a Bayer array type color filter is incorporated. FIG. 8 illustrates arrangement of colors in the optical filter 202 and the photosensor 203.

The arrangement of three colors R, G, and B in the optical filter 202 illustrated in FIG. 8 is arrangement called a Bayer array type. Any one of the colors R, G, and B is assigned, respectively, to each pixel in image data output by the photosensor 203, in such a manner as to correspond to R, G, and B arranged in the optical filter 202.

The spectral sensitivity characteristic storage memory 205 illustrated in FIG. 7 includes a function of recording a spectral sensitivity characteristic of the optical filter 202 and the photosensor 203 as an image sensor.

The image processing unit 204 illustrated in FIG. 7 includes a function similar to that of the image processing device 100 according to the first example embodiment, or that of the image processing device 100 according to the second example embodiment. In other words, the image processing unit 204 generates image data $I_R$ including only R color signals, image data $I_G$ including only G color signals, image data $I_B$ including only B color signals, and image data $I_{NIR}$ including only NIR signals, respectively, on the basis of image data composed of three color signals of R, G, and B.

The image processing unit 204 applies demosaicing processing and the image generation processing of the first example embodiment to image data $I_{RGB\_NIR}$ composed of three color signals of R, G, and B including NIR signals output from the photosensor 203. By applying each processing, the image processing unit 204 generates image data for four channels of R, G, B, and NIR.

Hereinafter, one example of demosaicing processing to be applied to image data $I_{RGB\_NIR}$ composed of three color signals of R, G, and B including NIR signals output from the photosensor 203 will be described with reference to FIG. 9.

Figure 9:
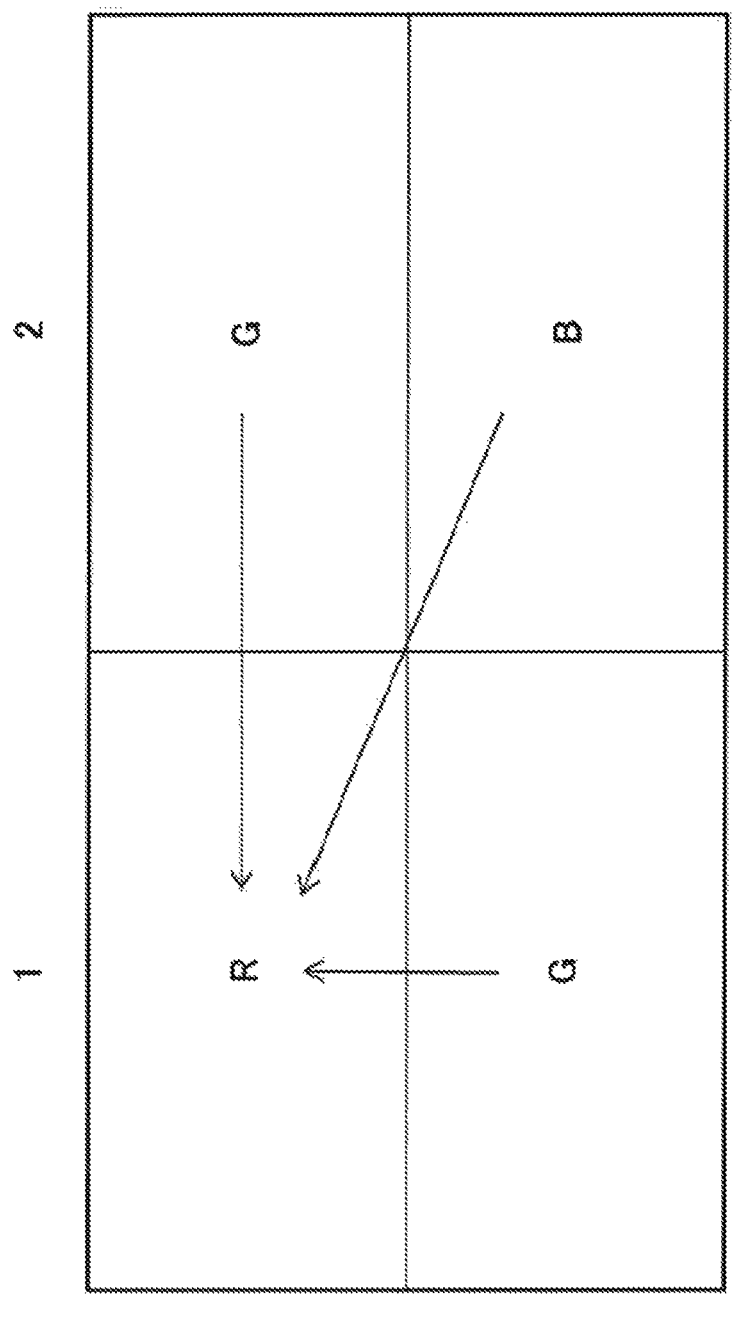
FIG. 9 is a plan view illustrating one example of demosaicing processing.

FIG. 9 is a plan view illustrating one example of demosaicing processing. Note that the demosaicing processing is equivalent to a part of the processing of separating image data $I_{RGB\_NIR}$ into image data $I_{R\_NIR}$, image data $I_{G\_NIR}$, and image data $I_{B\_NIR}$ performed by the image data acquisition units 101 of the first example embodiment and the second example embodiment.

First, the image processing unit 204 acquires data (R, G, and B color signals) on a pixel of coordinates (1,1) in image data illustrated in FIG. 9. The R, G, and B color signals at a point in time of acquisition by the image processing unit 204 include NIR signals, but are simply written as R, G, and B color signals for simplification of description.

As illustrated in FIG. 9, R is assigned to the pixel of coordinates (1,1). Thus, the image processing unit 204 directly sets the data on the pixel of coordinates (1,1) for a signal value of R as follows.

$$R(1,1)=R(1,1) \qquad \text{Equation (9)}$$

The image processing unit 204 interpolates a signal value of G and a signal value of B that are not assigned to the pixel of coordinates (1,1), for example, by using color signals of peripheral pixels as follows.

$$G(1,1)=(G(2,1)+G(1,2))/2 \qquad \text{Equation (10)}$$

$$B(1,1)=B(2,2) \qquad \text{Equation (11)}$$

Then, the image processing unit 204 acquires data (R, G, and B color signals) on a pixel of coordinates (1,2) in the image data. As illustrated in FIG. 9, G is assigned to the pixel of coordinates (1,2). Thus, the image processing unit 204 directly sets the data on the pixel of coordinates (1,2) for a signal value of G as follows.

$$G(1,2)=G(1,2) \qquad \text{Equation (12)}$$

Similarly to a case of the pixel of coordinates (1,1), the image processing unit 204 interpolates a signal value of R and a signal value of B that are not assigned to the pixel of coordinates (1,2), for example, by using color signals of peripheral pixels as follows.

$$R(1,2)=R(1,1) \qquad \text{Equation (13)}$$

$$B(1,2)=B(2,2) \qquad \text{Equation (14)}$$

In general, a signal value $X(i,j)$ of a color signal X (=R, B, or G) assigned to a pixel of coordinates $(i,j)$ is data itself on a pixel of X on the coordinates $(i,j)$. On the other hand, a signal value of a color signal Y (=R, B, or G) not assigned to a pixel of coordinates $(i,j)$ is a sum of pieces of weighted data on arbitrary one or more pixels (including Y) around the coordinates $(i,j)$. By repeatedly executing the above-described processing, the image processing unit 204 acquires image data including all R, G, and B color signals regarding all pixels. In other words, a signal value of near-infrared light in each channel included in image data may be a value that is equal for each channel.

Note that, the demosaicing processing according to the present example embodiment is not limited to the above-described processing, but a general demosaicing scheme may be used. With the processing described above, the image processing unit 204 acquires image data in which R, G, and B color signals are set for all pixels.

[Description of Operation]

Figure 10:
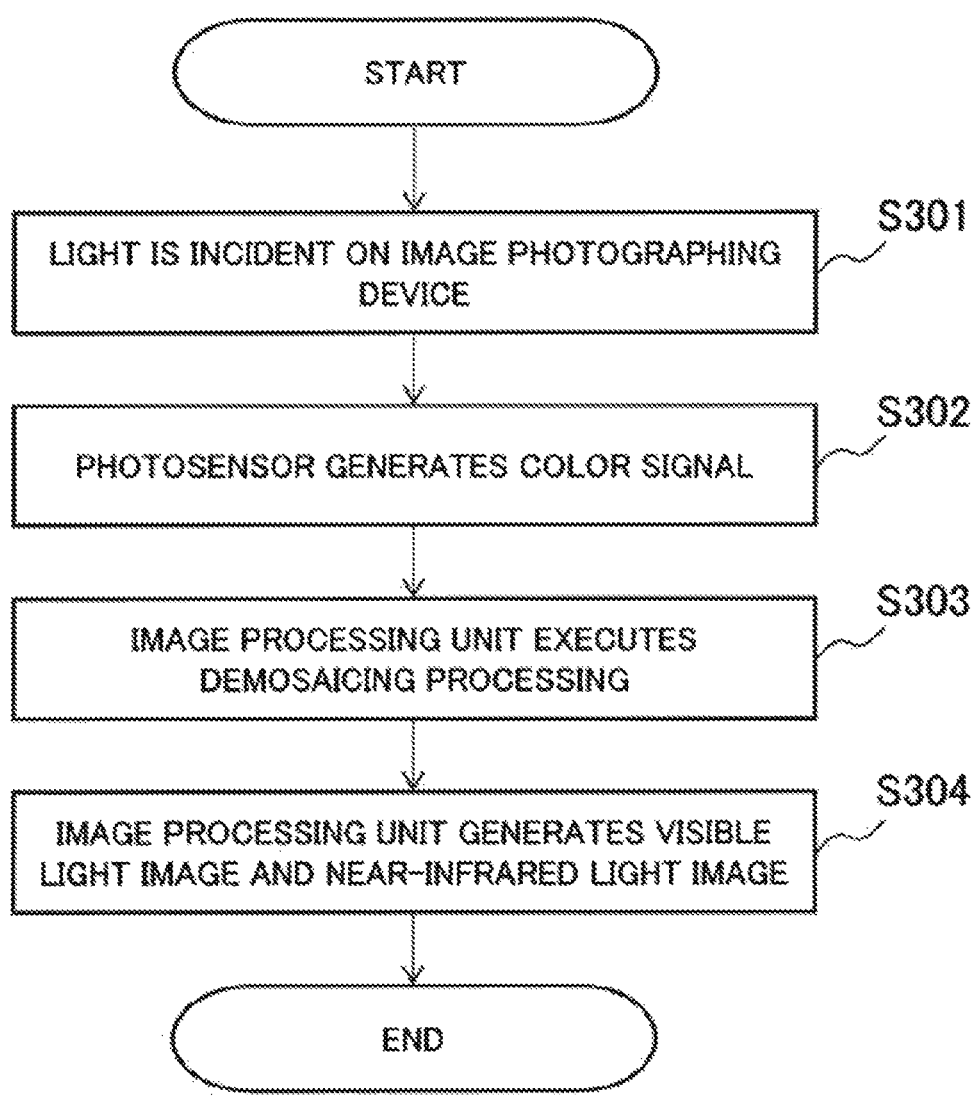
FIG. 10 is a flowchart illustrating an operation of image generation processing performed by the image capturing device 200 according to the third example embodiment.

Hereinafter, an operation of generating a visible light image and a near-infrared light image performed by the image capturing device 200 according to the present example embodiment will be described with reference to FIG. 10. FIG. 10 is a flowchart illustrating an operation of image generation processing performed by the image capturing device 200 according to the third example embodiment.

As illustrated in FIG. 10, light is incident on the image capturing device 200 through a camera lens (Step S301). The incident light, from which near-infrared light is not cut off, is incident on the photosensor 203 including the optical filter 202 incorporated therein in which R, G, and B are arranged in Bayer array.

Then, after the incident light passes through each filter of the optical filter 202, the photosensor 203 generates three color signals of R, G, and B including near-infrared light signals (Step S302).

Then, the image processing unit 204 acquires image data including all R, G, and B color signals regarding all pixels, by executing demosaicing processing (Step S303).

Then, the image processing unit 204 extracts or generates image data composed only of near-infrared light signals, on the basis of image data in which R, G, and B color signals are set for all pixels. In other words, the image processing unit 204 generates image data composed only of visible light signals and image data composed only of near-infrared light signals, on the basis of RGB image data including near-infrared light signals (Step S304).

The processing executed by the image processing unit 204 in Step S304 is the image generation processing illustrated in FIG. 3, or the image generation processing illustrated in FIG. 6. After each piece of image data is generated, the image capturing device 200 ends the image generation processing.

[Description of Advantageous Effect]

The image capturing device 200 according to the present example embodiment is an image capturing device including an optical system from which an IR cut filter included in a general image capturing device is removed. Since the IR cut filter can be removed readily, the image capturing device 200 according to the present example embodiment can be manufactured easily based on a general image capturing device.

In other words, the image capturing device 200 is a device that can be mass-produced at a low cost. In addition, because of a simple configuration, the image capturing device 200 is a compact capturing device, and is expected not to break down frequently. The image capturing device 200 according to the present example embodiment is able to acquire a visible light image and a near-infrared light image simultaneously, even with a configuration similar to a configuration of a general image capturing device.

Fourth Example Embodiment

[Description of Configuration]

Next, a fourth example embodiment of the present invention will be described with reference to the drawings. In the third example embodiment, description has been given to an example of applying the present invention to an image capturing device that splits incident light with a Bayer array type optical filter. In the present example embodiment, description will be given to an example of applying the present invention to a three-CCD image capturing device.

Figure 11:
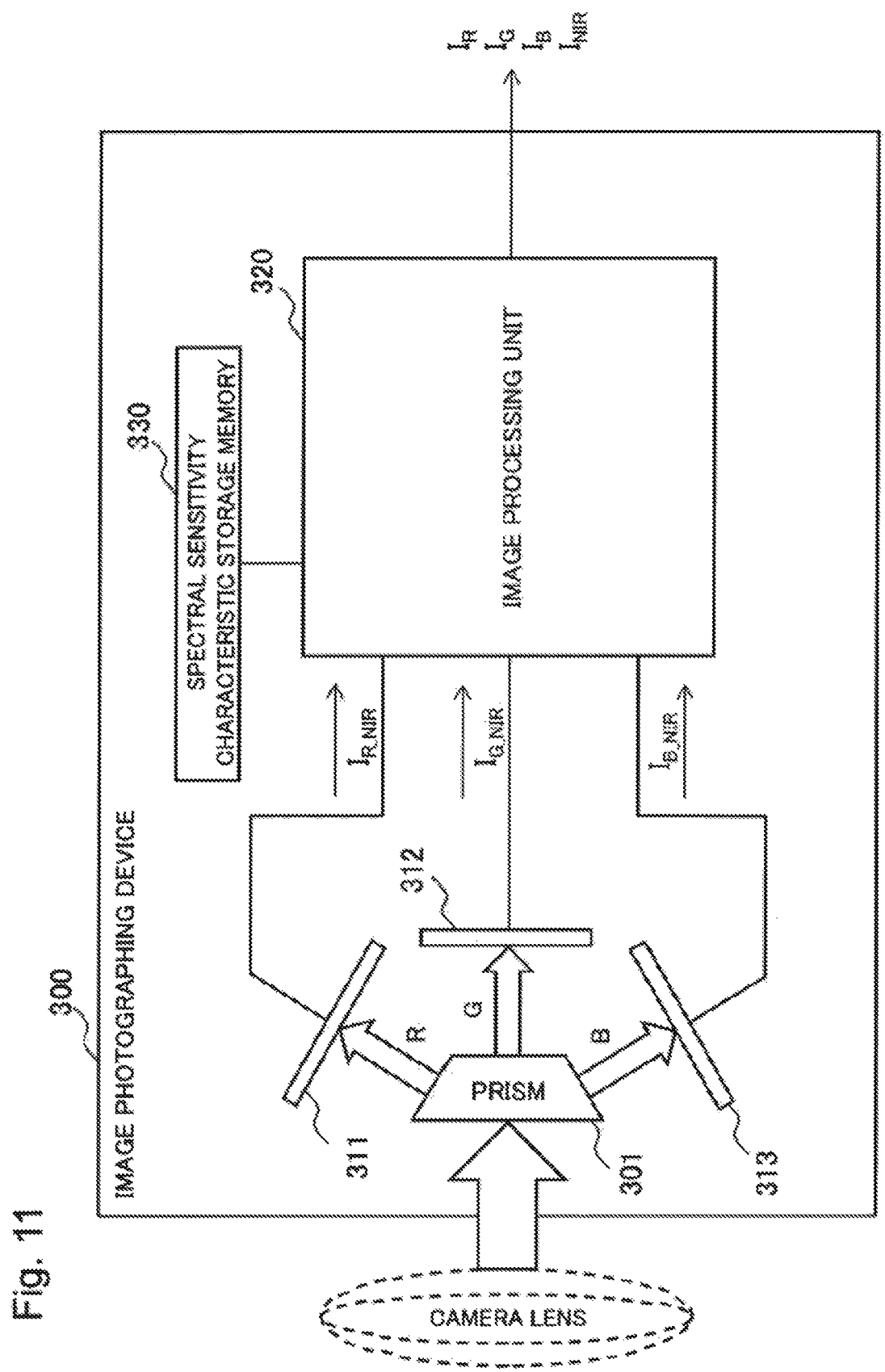
FIG. 11 is a block diagram illustrating a configuration example of a fourth example embodiment of an image capturing device 300 according to the present invention.

FIG. 11 is a block diagram illustrating a configuration example of the fourth example embodiment of an image capturing device 300 according to the present invention. As illustrated in FIG. 11, the image capturing device 300 is constituted by a prism (color decomposition unit) 301, photosensors 311 to 313, an image processing unit 320, and a spectral sensitivity characteristic storage memory 330.

For a camera lens illustrated in FIG. 11, a normal camera lens may be used. Further, for the prism 301 and the photosensors 311 to 313, a prism and photosensors used generally in a three-CCD image capturing device may be respectively used.

Light incident on the image capturing device 300 through the camera lens is split by the prism 301 into light of three colors of R, G, and B. Outlined arrows illustrated in FIG. 11 represent light.

The photosensor 311 captures color light of R, and outputs image data $I_{R\_NIR}$. Further, the photosensor 312 captures color light of G, and outputs image data $I_{G\_NIR}$. Further, the photosensor 313 captures color light of B, and outputs image data $I_{B\_NIR}$.

Note that color light to be generated by splitting light with the prism 301 includes near-infrared light. Since a near-infrared light cut filter for cutting off near-infrared light is not mounted on the image capturing device 300 according to the present example embodiment, each piece of image data to be output from the photosensors 311 to 313 includes near-infrared light signals.

Further, a ratio of near-infrared light signals included in each piece of image data is a value less than a predetermined threshold value designated by a user.

Each piece of image data $I_{R\_NIR}$, $I_{G\_NIR}$, and $I_{B\_NIR}$ of R, G, and B including NIR signals output from the photosensors 311 to 313 is input respectively to the image processing unit 320. Similarly to the image processing unit 204 of the third example embodiment, the image processing unit 320 generates image data $I_R$ including only R color signals, image data $I_G$ including only G color signals, image data $I_B$ including only B color signals, and image data $I_{NIR}$ including only NIR signals, respectively, on the basis of each piece of R, G, and B image data including NIR signals.

[Description of Operation]

Figure 12:
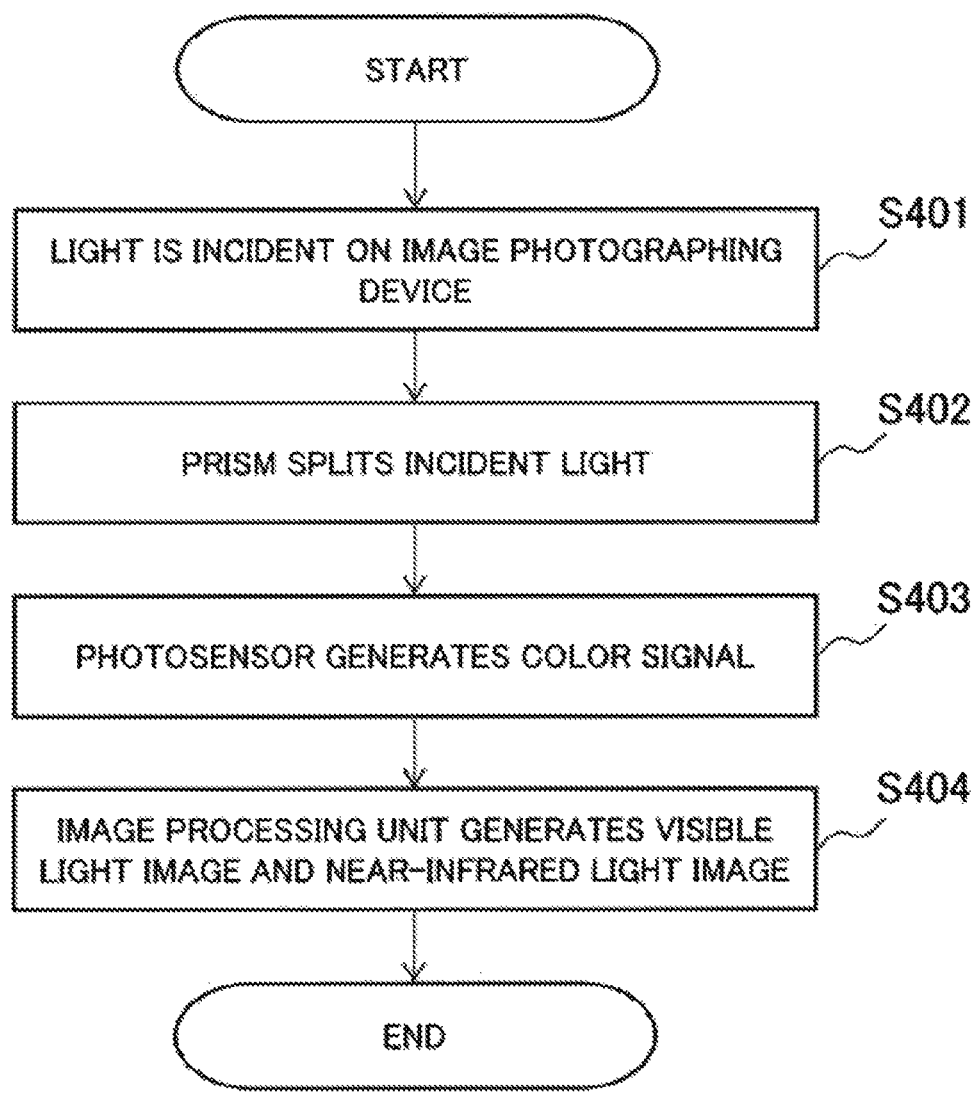
FIG. 12 is a flowchart illustrating an operation of image generation processing performed by the image capturing device 300 of the fourth example embodiment.

Hereinafter, an operation of generating a visible light image and a near-infrared light image performed by the image capturing device 300 according to the present example embodiment will be described with reference to FIG. 12. FIG. 12 is a flowchart illustrating an operation of image generation processing performed by the image capturing device 300 according to the fourth example embodiment.

As illustrated in FIG. 12, light is incident on the image capturing device 300 through a camera lens (Step S401). The incident light, from which near-infrared light is not cut off, is incident on the prism 301.

Then, the incident light is split by the prism 301 into three rays of visible light of R, G, and B including near-infrared light (Step S402).

Then, the photosensor 311 captures color light of R, and outputs image data $I_{R\_NIR}$. Further, the photosensor 312 captures color light of G, and outputs image data $I_{G\_NIR}$. Further, the photosensor 313 captures color light of B, and outputs image data $I_{B\_NIR}$ (Step S403).

Then, the image processing unit 320 generates image data composed only of visible light signals and image data composed only of near-infrared light signals, on the basis of each piece of R, G, and B image data including near-infrared light signals (Step S404).

The processing executed by the image processing unit 320 in Step S404 is the image generation processing illustrated in FIG. 3, or the image generation processing illustrated in FIG. 6. After each piece of image data is generated, the image capturing device 300 ends the image generation processing.

[Description of Advantageous Effect]

The image capturing device 300 according to the present example embodiment includes a prism and photosensors constituting a general three-CCD capturing device. Further, an IR cut filter generally mounted on a three-CCD capturing device is removed.

In other words, the image capturing device 300 can be manufactured by merely making a slight modification to a configuration of a general three-CCD capturing device. Thus, it can be expected that the image capturing device 300 is manufactured at a low cost, and that the image capturing device 300 does not break down frequently. The image capturing device 300 is able to simultaneously acquire a visible light image composed only of visible light signals and a near-infrared light image composed only of near-infrared light signals.

The image processing device 100 of each example embodiment is able to reconstruct a visible light image composed only of visible light signals and a near-infrared light image composed only of near-infrared light signals, from image data captured with use of a general color image sensor, without using a special device or a mechanical drive mechanism for capturing near-infrared light.

In other words, since no special sensor or no mechanical drive mechanism is included, an observation device that observes visible light and near-infrared light to which the technique of each example embodiment is applied is able to generate a visible light image and a near-infrared light image with a simple device configuration. Use of the technique of each example embodiment achieves simplification of circuit and device configurations.

Note that, in each example embodiment, description has been given by assuming that color channels are R channel, G channel, and B channel. However, color channels may be other channels such as cyan (C) channel, magenta (M) channel, and yellow (Y) channel.

Note that, the image processing device 100 of each example embodiment is implemented by, for example, a central processing unit (CPU) that executes processing in accordance with a program stored in a storage medium. In other words, the image data acquisition unit 101, the incident light spectrum estimation unit 102, the visible light image generation unit 103, the near-infrared light image generation unit 104, and the signal separation unit 105 are implemented by, for example, a CPU that executes processing in accordance with program control. Further, only some of the functions may be implemented by a CPU.

Further, each unit in the image processing device 100 of each example embodiment may be implemented by a hardware circuit. As one example, the image data acquisition unit 101, the incident light spectrum estimation unit 102, the visible light image generation unit 103, the near-infrared light image generation unit 104, and the signal separation unit 105 are implemented respectively by large scale integration (LSI). Further, these units may be implemented by one LSI.

Figure 13:
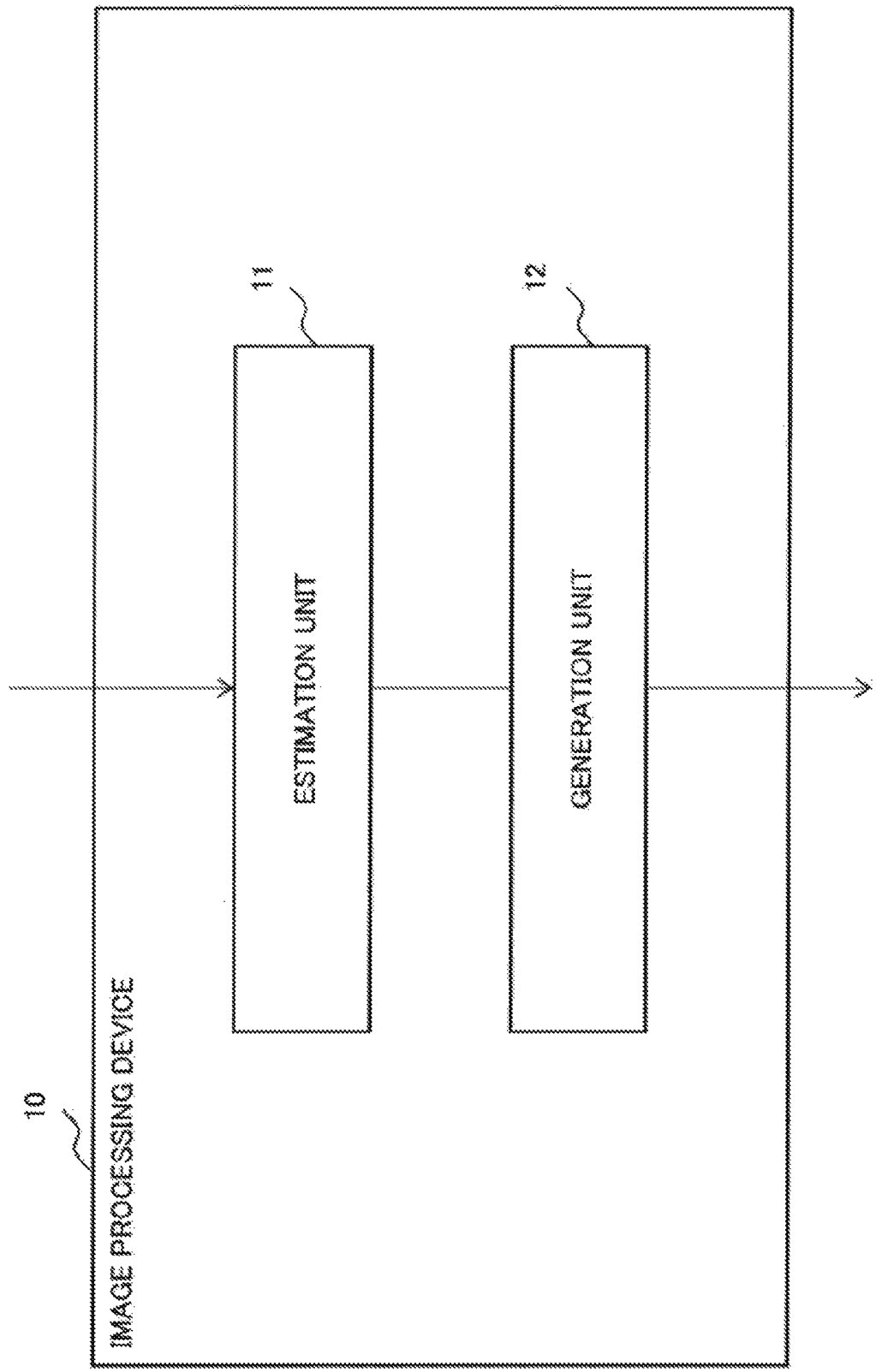
FIG. 13 is a block diagram illustrating an overview of the image processing device according to the present invention.
Figure 14:
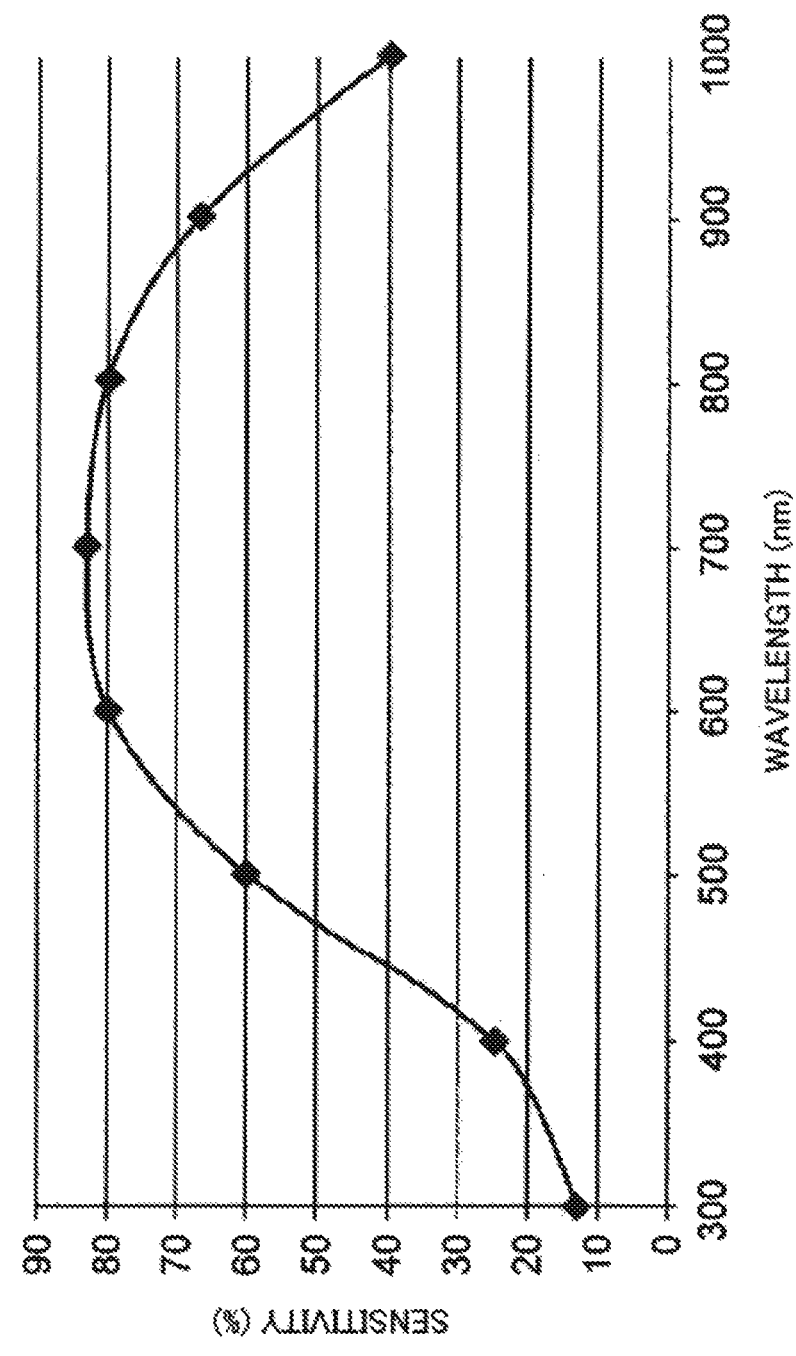
FIG. 14 is an explanatory diagram illustrating one example of a spectral sensitivity characteristic of a general image sensor.

Next, an overview of the example embodiments of the present invention will be described. FIG. 13 is a block diagram illustrating an overview of the image processing device according to the example embodiments of the present invention. In FIG. 13, an image processing device 10 according to the example embodiments of the present invention includes an estimation unit 11 (for example, the incident light spectrum estimation unit 102 illustrated in FIG. 1 and the like) that estimates, by using a spectral sensitivity characteristic of a color image sensor in a wavelength range from visible light to near-infrared light and image data including one or more color channels and in which visible light and near-infrared light output from the color image sensor are captured, a spectral distribution characteristic of light incident on the color image sensor, based on a model expressing the spectral distribution characteristic of incident light, and a generation unit 12 (for example, the visible light image generation unit 103 and the near-infrared light image generation unit 104 illustrated in FIG. 1 and the like) that generates, by using the estimated spectral distribution characteristic and the spectral sensitivity characteristic, visible light image data composed only of information representing visible light and near-infrared light image data composed only of information representing near-infrared light, wherein each integral value of the spectral sensitivity characteristic in a wavelength range of near-infrared light relating to each of the one or more color channels of the color image sensor satisfies a predetermined condition.

With such a configuration, the image processing device is able to easily generate a visible light image signal and a near-infrared light image signal respectively from an image signal captured in a wavelength range from visible light to near-infrared light.

Further, the generation unit 12 may generate the visible light image data composed only of information representing visible light, by using a product of the estimated spectral distribution characteristic by the spectral sensitivity characteristic in a wavelength range of visible light, and may generate the near-infrared light image data composed only of information representing near-infrared light, by using a product of the spectral distribution characteristic by the spectral sensitivity characteristic in a wavelength range of near-infrared light.

With such a configuration, the image processing device is able to adjust a wavelength range of visible light and a wavelength range of near-infrared light associated with an image signal to be generated.

Further, the generation unit 12 may generate the visible light image data composed only of information representing visible light, by using a product of the estimated spectral distribution characteristic by the spectral sensitivity characteristic in a wavelength range of visible light, and may generate the near-infrared light image data composed only of information representing near-infrared light, by subtracting the generated visible light image data from the image data in which visible light and near-infrared light are captured.

Further, the generation unit 12 may generate the near-infrared light image data composed only of information representing near-infrared light, by using a product of the estimated spectral distribution characteristic by the spectral sensitivity characteristic in a wavelength range of near-infrared light, and may generate the visible light image data composed only of information representing visible light, by subtracting the generated near-infrared light image data from the image data in which visible light and near-infrared light are captured.

With such a configuration, the image processing device is able to reduce a cost relating to generation of an image signal.

Further, the spectral distribution characteristic of incident light may be modeled by a weighted sum of basis vectors $r_i(\lambda)$ (i=1 to M) of the spectral distribution characteristic, or may be modeled by a weighted sum of basis vectors $r_i(\lambda)$ (i=1 to M+1), with use of a relatively small number of parameters. Alternatively, the spectral distribution characteristic of incident light may be modeled by the weighted sum of the basis vectors $r_i(\lambda)$ (i=1 to M) and a mean vector $r_0(\lambda)$ of the spectral distribution characteristic, or may be modeled by the weighted sum of the basis vectors $r_i(\lambda)$ (i=1 to M+1) and the mean vector $r_0(\lambda)$.

For example, the model expressing the spectral distribution characteristic of incident light may be represented by either a sum of a mean vector of the spectral distribution characteristic of incident light and a weighted sum of basis vectors as many as the number of the one or more color channels included in the image data, or a weighted sum of basis vectors as many as the number incremented by 1 to the number of the color channels.

With such a configuration, the image processing device is able to easily generate a visible light image signal and a near-infrared light image signal respectively by finding a solution of an observation equation.

Further, the one or more color channels included in the image data may be a red channel, a green channel, and a blue channel.

With such a configuration, the image processing device is able to support image data of RGB channels.

Further, the color image sensor may be an image sensor included in a three-CCD image capturing device.

With such a configuration, the image processing device is able to support image data captured with the three-CCD image capturing device.

Further, the image processing device 10 may include an acquisition unit that acquires image data including one or more color channels by capturing, using the color image sensor, incident light including visible light and near-infrared light.

In the above, the invention of the present application has been described with reference to the example embodiments and examples. However, the invention of the present application is not limited to the above-described example embodiments and examples. Various modifications that can be understood by a person skilled in the art can be made to the configurations and details of the invention of the present application within the scope of the invention of the present application.

In the above, the present invention has been described using each of the example embodiments described above as an exemplary example. However, the present invention is not limited to the above-described example embodiments. In other words, various modes that can be understood by a person skilled in the art can be applied to the present invention within the scope of the present invention.

This application is based upon and claims the benefit of priority from Japanese Patent Application No. 2016-249056, filed on Dec. 22, 2016, the disclosure of which is incorporated herein in its entirety.

REFERENCE SIGNS LIST 10, 100 Image processing device
11 Estimation unit
12 Generation unit
101 Image data acquisition unit
102 Incident light spectrum estimation unit
103 Visible light image generation unit
104 Near-infrared light image generation unit
105 Signal separation unit
110 External means
200, 300 Image capturing device
201 Infrared light cut filter
202 Optical filter
203 Photosensor
204, 320 Image processing unit
205, 330 Spectral sensitivity characteristic storage memory
301 Prism
311 to 313 Photosensor

The invention claimed is:

1. An image processing method comprising:

estimating, by using image data and a spectral sensitivity characteristic of a color image sensor in a wavelength range from visible light to near-infrared light, a spectral distribution characteristic of an incident light incident on the color image sensor, based on a model expressing the spectral distribution characteristic of the incident light, the image data including one or more color channels and acquired by capturing, using the color image sensor, the incident light including visible light and near-infrared light; and generating, by using the estimated spectral distribution characteristic of the incident light and the spectral sensitivity characteristic of the color image sensor, visible light image data composed only of information representing visible light and near-infrared light image data composed only of information representing near-infrared light, wherein each integral value of the spectral sensitivity characteristic of the color image sensor in a wavelength range of near-infrared light relating to each of the one or more color channels of the color image sensor satisfies a predetermined condition, wherein spectral distribution characteristic of incident light is modeled by a weighted sum of basis vectors $r_i(\lambda)$ (i=1 to M), where M is an integer of 1 or greater), is modeled by a weighted sum of basis vectors $r_i(\lambda)$ (i=1 to M+1), is modeled by the weighted sum of the basis vectors $r_i(\lambda)$ (i=1 to M) and a mean vector $r_0(\lambda)$ of the spectral distribution characteristic, or is modeled by the weighted sum of the basis vectors $r_i(\lambda)$ (i=1 to M+1) and the mean vector $r_0(\lambda)$.

2. The image processing method according to claim 1, further comprising:

generating the visible light image data composed only of information representing visible light, by using a product of the estimated spectral distribution characteristic of the incident light by the spectral sensitivity characteristic of the color image sensor in a wavelength range of visible light; and generating the near-infrared light image data composed only of information representing near-infrared light, by using a product of the estimated spectral distribution characteristic of the incident light by the spectral sensitivity characteristic of the color image sensor in a wavelength range of near-infrared light.

3. The image processing method according to claim 1, further comprising:

generating the visible light image data composed only of information representing visible light, by using a product of the estimated spectral distribution characteristic of the incident light by the spectral sensitivity characteristic of the color image sensor in a wavelength range of visible light; and generating the near-infrared light image data composed only of information representing near-infrared light, by subtracting the generated visible light image data from the image data in which visible light and near-infrared light are captured.

4. The image processing method according to claim 1, further comprising:

generating the near-infrared light image data composed only of information representing near-infrared light, by using a product of the estimated spectral distribution characteristic of the incident light by the spectral sensitivity characteristic of the color image sensor in a wavelength range of near-infrared light; and generating the visible light image data composed only of information representing visible light, by subtracting the generated near-infrared light image data from the image data in which visible light and near-infrared light are captured.

5. The image processing method according to claim 1, wherein the one or more color channels included in the image data are a red channel, a green channel, and a blue channel.

6. An image processing device comprising:

at least one memory storing a program; and at least one processor configured to execute the program to perform:

estimating, by using image data and a spectral sensitivity characteristic of a color image sensor in a wavelength range from visible light to near-infrared light, a spectral distribution characteristic of an incident light incident on the color image sensor, based on a model expressing the spectral distribution characteristic of the incident light, the image data including one or more color channels and acquired by capturing, using the color image sensor, the incident light including visible light and near-infrared light; and generating, by using the estimated spectral distribution characteristic of the incident light and the spectral sensitivity characteristic of the color image sensor, visible light image data composed only of information representing visible light and near-infrared light image data composed only of information representing near-infrared light, wherein each integral value of the spectral sensitivity characteristic of the color image sensor in a wavelength range of near-infrared light relating to each of the one or more color channels of the color image sensor satisfies a predetermined condition, wherein spectral distribution characteristic of incident light is modeled by a weighted sum of basis vectors $r_i(\lambda)$ (i=1 to M, where M is an integer of 1 or greater), is modeled by a weighted sum of basis vectors $r_i(\lambda)$ (i=1 to M+1), is modeled by the weighted sum of the basis vectors $r_i(\lambda)$ (i=1 to M) and a mean vector $r_0(\lambda)$ of the spectral distribution characteristic, or is modeled by the weighted sum of the basis vectors $r_i(\lambda)$ (i=1 to M+1) and the mean vector $r_0(\lambda)$.

7. The image processing device according to claim 6, wherein the at least one processor is configured to perform:

generating the visible light image data composed only of information representing visible light, by using a product of the estimated spectral distribution characteristic of the incident light by the spectral sensitivity characteristic of the color image sensor in a wavelength range of visible light, and generating the near-infrared light image data composed only of information representing near-infrared light, by using a product of the spectral distribution characteristic of the incident light by the spectral sensitivity characteristic of the color image sensor in a wavelength range of near-infrared light.

8. A non-transitory storage medium recording an image processing program for causing a computer to execute:

estimation processing of estimating, by using image data and a spectral sensitivity characteristic of a color image sensor in a wavelength range from visible light to near-infrared light, a spectral distribution characteristic of an incident light incident on the color image sensor, based on a model expressing the spectral distribution characteristic of the incident light, the image data including one or more color channels and acquired by capturing, using the color image sensor, the incident light including visible light and near-infrared light; and generation processing of generating, by using the estimated spectral distribution characteristic of the incident light and the spectral sensitivity characteristic of the color image sensor, visible light image data composed only of information representing visible light and near-infrared light image data composed only of information representing near-infrared light, wherein each integral value of the spectral sensitivity characteristic of the color image sensor in a wavelength range of near-infrared light relating to each of the one or more color channels of the color image sensor satisfies a predetermined condition, wherein spectral distribution characteristic of incident light is modeled by a weighted sum of basis vectors $r_i(\lambda)$ (i=1 to M, where M is an integer of 1 or greater), is modeled by a weighted sum of basis vectors $r_i(\lambda)$ (i=1 to M+1), is modeled by the weighted sum of the basis vectors $r_i(\lambda)$ (i=1 to M) and a mean vector $r_0(\lambda)$ of the spectral distribution characteristic, or is modeled by the weighted sum of the basis vectors $r_i(\lambda)$ (i=1 to M+1) and the mean vector $r_0(\lambda)$.

9. The storage medium according to claim 8, wherein the image processing program causes a computer to execute:

first generation processing of generating the visible light image data composed only of information representing visible light, by using a product of the estimated spectral distribution characteristic of the incident light by the spectral sensitivity characteristic of the color image sensor in a wavelength range of visible light; and second generation processing of generating the near-infrared light image data composed only of information representing near-infrared light, by using a product of the estimated spectral distribution characteristic of the incident light by the spectral sensitivity characteristic of the color image sensor in a wavelength range of near-infrared light.

* * * * *